(12) United States Patent
Hase et al.

(10) Patent No.: US 11,186,259 B2
(45) Date of Patent: Nov. 30, 2021

(54) WIPER DRIVE DEVICE

(71) Applicant: DENSO CORPORATION, Kariya (JP)

(72) Inventors: Tomomi Hase, Kariya (JP); Mitsuharu Higashitani, Kariya (JP); Noriaki Ikemoto, Kariya (JP); Hidetoshi Suzuki, Kariya (JP); Shogo Hanai, Kariya (JP); Keisuke Koide, Kariya (JP)

(73) Assignee: DENSO CORPORATION, Kariya (JP)

( * ) Notice: Subject to any disclaimer, the term of this patent is extended or adjusted under 35 U.S.C. 154(b) by 150 days.

(21) Appl. No.: 16/686,783

(22) Filed: Nov. 18, 2019

(65) Prior Publication Data
US 2020/0079324 A1 Mar. 12, 2020

Related U.S. Application Data

(63) Continuation of application No. PCT/JP2018/018295, filed on May 11, 2018.

(30) Foreign Application Priority Data

May 22, 2017 (JP) .............................. JP2017-100797

(51) Int. Cl.
  *B60S 1/08* (2006.01)
  *G06T 7/12* (2017.01)
  *B60S 1/52* (2006.01)
(52) U.S. Cl.
  CPC .............. *B60S 1/08* (2013.01); *B60S 1/0833* (2013.01); *B60S 1/524* (2013.01); *G06T 7/12* (2017.01)

(58) Field of Classification Search
  CPC .......... B60S 1/08; B60S 1/524; B60S 1/0452; B60S 1/0833
  See application file for complete search history.

(56) References Cited

U.S. PATENT DOCUMENTS

| | | | |
|---|---|---|---|
| 8,913,132 B2 * | 12/2014 | Seger | |
| 9,660,559 B2 * | 5/2017 | Kimura et al. | |
| 2015/0189172 A1 | 7/2015 | Kim | |
| 2016/0306030 A1 | 10/2016 | Hara et al. | |

FOREIGN PATENT DOCUMENTS

| | | |
|---|---|---|
| JP | H08-72641 A | 3/1996 |
| JP | 2003-220929 A | 8/2003 |
| JP | 2008-236530 A | 10/2008 |
| JP | 2016-203690 A | 12/2016 |
| JP | 2017-24610 A | 2/2017 |

* cited by examiner

*Primary Examiner* — Michael D Jennings
(74) *Attorney, Agent, or Firm* — Oliff PLC

(57) ABSTRACT

A wiper drive device includes: a drive member that is configured to cause a wiper blade to wipe a region of a windshield as a wiping operation, the region of the windshield including a to-be-imaged region of the windshield, the to-be-imaged region being included in a field of view of a camera which images a predefined imaging range near a vehicle through the windshield; and a stop section that is configured to stop the wiper blade in an outside region in response to that an anomaly that hinders the wiping operation occurs while the drive member causes the wiper blade to perform the wiping operation on the windshield, the outside region being a region of the windshield outside of the to-be-imaged region.

18 Claims, 15 Drawing Sheets

WIPER DRIVE DEVICE

CROSS REFERENCE TO RELATED APPLICATION

The present application is a continuation application of International Patent Application No. PCT/JP2018/018295 filed on May 11, 2018 which designated the U. S. and claims the benefit of priority from Japanese Patent Application No. 2017-100797 filed on May 22, 2017. The entire disclosures of all of the above applications are incorporated herein by reference.

TECHNICAL FIELD

The present disclosure relates to a wiper drive device.

BACKGROUND

In automated driving of a vehicle, objects such as obstacles located forward of the vehicle are detected based on image data obtained from an image of a region mainly forward of the vehicle captured by a camera.

SUMMARY

The present disclosure describes a wiper drive device including a drive member that is configured to cause a wiper blade to wipe a region of a windshield; and a stop section that is configured to stop the wiper blade.

BRIEF DESCRIPTION OF DRAWINGS

Objects, features and advantages of the present disclosure will become more apparent from the following detailed description made with reference to the accompanying drawings. In the drawings.

DETAILED DESCRIPTION

In automated driving of a vehicle, objects such as obstacles located forward of the vehicle are detected based on image data obtained from an image of a region mainly forward of the vehicle captured by a camera. The camera is placed in the cabin of the vehicle in many cases to capture an image of a region mainly forward of the vehicle through a windshield glass (windshield). Incidentally, the automated driving of a vehicle may be referred to as autonomous driving.

A predefined range of the windshield glass included in the angle of view of the camera is wiped by a wiper system as appropriate, so that the field of view of the camera is not obstructed by dirt or raindrops.

In an automated vehicle, a camera is placed on the windshield glass inside the cabin at a location before an upper reversing position of the wiper system.

In the automated vehicle disclosed in a related art in which a camera is placed near the wiper system's upper reversing position, the wiper blade may stop and block the field of view of the camera if the supply voltage drops while the wiper system operates.

The present disclosure describes a wiper drive device that stops a wiper blade so that the wiper blade does not obstruct the field of view of a camera.

According to one aspect of the present disclosure, a wiper drive device may include: a drive member that is configured to cause a wiper blade to wipe a region of a windshield as a wiping operation, the region of the windshield including a to-be-imaged region of the windshield, the to-be-imaged region being included in a field of view of a camera which images a predefined imaging range near a vehicle through the windshield; and a stop section that is configured to stop the wiper blade in an outside region in response to that an anomaly that hinders the wiping operation occurs while the drive member causes the wiper blade to perform the wiping operation on the windshield, the outside region being a region of the windshield outside of the to-be-imaged region.

By performing control for stopping the wiper blade outside of the to-be-imaged region on the windshield when an anomaly that hinders the wiping operation occurs, it is possible to stop the wiper blade according the configuration of the present disclosure, so that the wiper blade does not block the field of view of the camera.

First Embodiment

Figure 1:
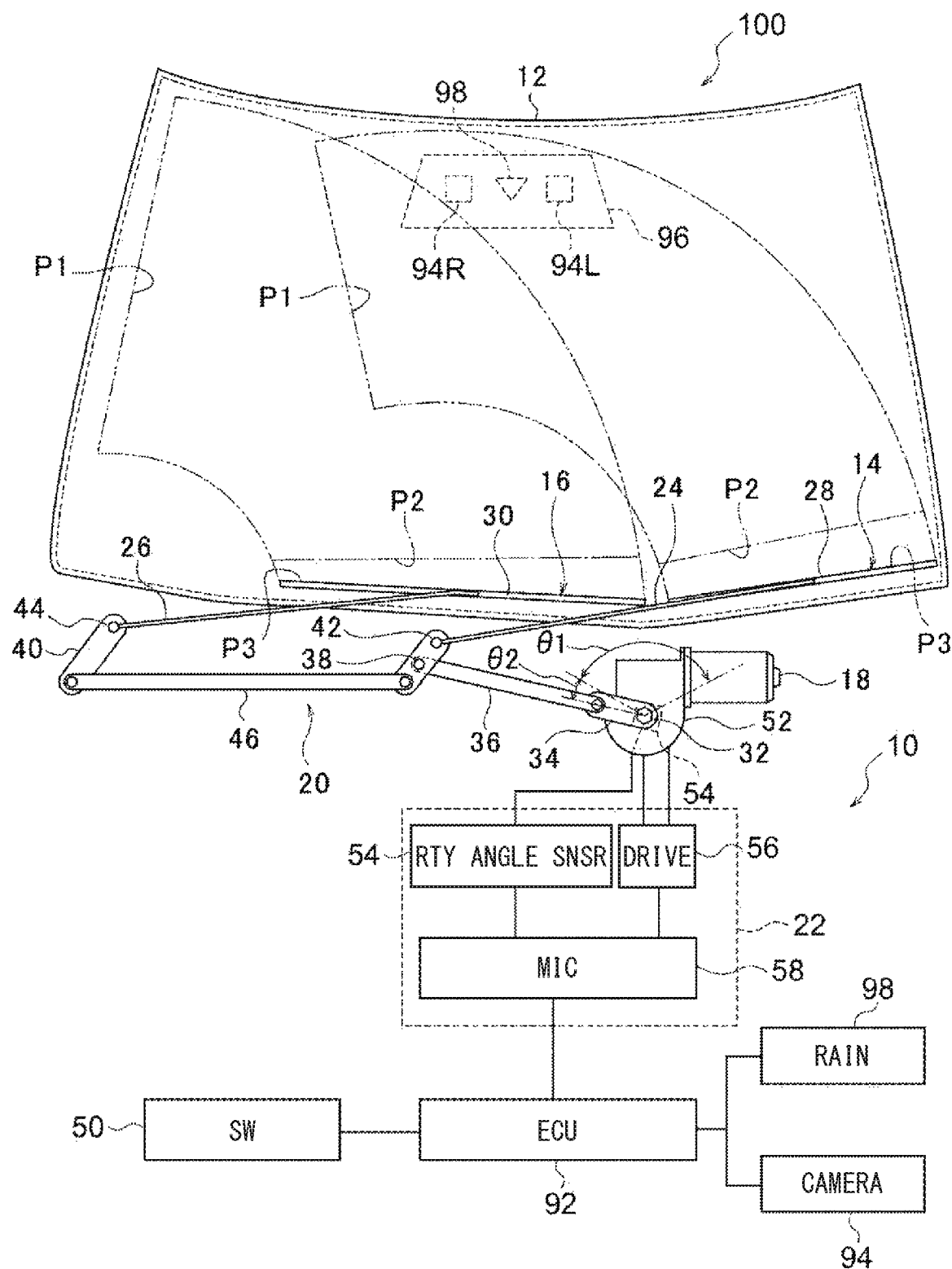
FIG. 1 is a schematic diagram of a configuration of a wiper system including a wiper drive device according to a first embodiment of the present disclosure.

FIG. 1 is a schematic diagram of a configuration of a wiper system 100 that includes a wiper drive device 10 according to the present embodiment. The wiper system 100 is a system for wiping a windshield glass 12 of a vehicle such as, for example, a passenger automobile. The wiper system 100 includes a pair of wipers 14, 16, a wiper motor 18, a link mechanism 20, and a wiper drive device 10.

The wipers 14, 16 include respective wiper arms 24, 26 and respective wiper blades 28, 30. The wiper arms 24, 26 have respective proximal end portions that are secured to respective pivot shafts 42, 44 described below. The wiper blades 28, 30 are secured to respective distal end portions of the wiper arms 24, 26.

The wiper blades 28, 30 of the wipers 14, 16 move back and forth over the windshield glass 12 with wiping the windshield glass 12, as the wiper arms 24, 26 move.

The wiper motor 18 includes an output shaft 32 rotatable in normal and reverse directions via a speed reduction mechanism 52 configured by mainly using a worm gear. The link mechanism 20 includes a crank arm 34, a first link rod 36, a pair of pivot levers 38, 40, the pivot shafts 42, 44, and a second link rod 46.

The crank arm 34 has one end secured to the output shaft 32 and the other end operably coupled to one end of the first link rod 36. The pivot lever 38 has an end provided with the pivot shaft 42 and another end without the pivot shaft 42. The other end of the first link rod 36 is operably coupled to a portion of the pivot lever 38 toward the other end of the pivot lever 38. The pivot lever 40 has one end and another end corresponding to those of the pivot lever 38. The other end of the pivot lever 38 and the other end of the pivot lever 40 are operably coupled to respective ends of the second link rod 46.

The pivot shafts 42, 44 are operably supported by pivot holders (not shown) provided to a vehicle body. The one ends of the pivot levers 38, 40 provided with the respective pivot shafts 42, 44 are secured to the respective wiper arms 24, 26 via the pivot shafts 42, 44.

In the wiper system 100 including the wiper drive device 10 according to the present embodiment, when the output shaft 32 is rotated in the normal and reverse directions by a rotary angle θ1 in a predefined range, the rotating force of the output shaft 32 is transmitted via the link mechanism 20 to the wiper arms 24, 26, causing the wiper arms 24, 26 to move back and forth and thereby the wiper blades 28, 30 to move back and forth over the windshield glass 12 between respective lower reversing positions P2 and respective upper reversing positions P1. While θ1 can take different values depending on factors such as the configuration of the link mechanism 20 of the wiper drive device 10, 140° is used as an example in the present embodiment.

In the wiper system 100 including the wiper drive device 10 according to the present embodiment, when the wiper blades 28, 30 are in respective park positions P3 as illustrated in FIG. 1, the crank arm 34 and the first link rod 36 form a straight line shape.

The park positions P3 are placed below the respective lower reversing positions P2. The wiper blades 28, 30 in the lower reversing positions P2 move to the park positions P3 when the output shaft 32 is rotated by θ2. While θ2 may take different values depending on factors such as the configuration of the link mechanism of the wiper drive device 10, 10° is used as an example in the present embodiment.

When θ2 is "zero," the lower reversing positions P2 are coincident with the respective park positions P3, and the wiper blades 28, 30 are stopped and parked at the respective lower reversing positions P2.

The wiper motor 18 is connected to a wiper motor control circuit 22 for controlling the rotation of the wiper motor 18. The wiper motor control circuit 22 according to the present embodiment includes a microcomputer 58 and a drive circuit 56 for generating voltage to be applied to a coil of the wiper motor 18.

The microcomputer 58 of the wiper motor control circuit 22 controls the rotational speed of the wiper motor 18 based on a detection result of a rotary angle sensor 54 that detects the rotational speed and rotary angle of the output shaft 32 of the wiper motor 18. Placed in the speed reduction mechanism 52 of the wiper motor 18, the rotary angle sensor 54 detects a magnetic field (magnetic force) of a sensor magnet 70 that is rotated in concert with the output shaft 32 and converts a detection result to an electric current.

The rotational speed and rotary angle of the output shaft 32 are not identical with those of the wiper motor itself because the wiper motor 18 in the present embodiment includes the speed reduction mechanism 52 as described above. The rotational speed and rotary angle of the output shaft 32 are, however, used as the rotational speed and rotary angle of the wiper motor 18 below because the wiper motor itself and the speed reduction mechanism 52 are integral with each other inseparably in the present embodiment.

The microcomputer 58 can calculate the positions of the wiper blades 28, 30 on the windshield glass 12 and the rotational speed of the output shaft 32 from the rotary angle of the output shaft 32 detected by the rotary angle sensor 54. The microcomputer 58 controls the drive circuit 56 to cause the rotational speed of the output shaft 32 to change in accordance with the positions of the wiper blades 28, 30. The drive circuit 56 is a circuit that generates voltage to be applied to the wiper motor 18 based on the control of the wiper motor control circuit 22. The drive circuit 56 generates the voltage by switching the electric power from a power source, which is a battery 80 of the vehicle.

The microcomputer 58 of the wiper motor control circuit 22 is connected to a wiper switch 50 via a main electronic controller (ECU) 92 that performs tasks such as controlling an engine of the vehicle. The wiper switch 50 is a switch that turns on or off the electric power supplied from the battery 80 of the vehicle to the wiper motor 18. The wiper switch 50 can be switched between a low speed operation mode position (LOW) for operation of the wiper blades 28, 30 at low speed, a high speed operation mode position (HIGH) for operation at high speed, an intermittent operation mode position (INT) for intermittent operation with a certain cycle, an auto operation mode position (AUTO) for operation performed when a rain sensor 98 detects water droplets, and a stop mode position (OFF). The wiper switch 50 outputs a command signal to the microcomputer 58 via the main ECU 92 for operating the wiper motor 18 in accordance with the selected mode position. For example, the wiper motor 18 is operated at high speed when the wiper switch 50 is in the high speed operation mode position and at low speed when the wiper switch 50 is in the low speed operation mode position. The wiper motor 18 is operated intermittently when the wiper switch 50 is in the intermittent operation mode position.

When a signal output by the wiper switch 50 in accordance with the selected mode position is received by the microcomputer 58 via the main ECU 92, the microcomputer 58 performs control corresponding to the command signal from the wiper switch 50. Specifically, the microcomputer 58 controls the voltage to be applied to the wiper motor 18 based on the command signal from the wiper switch 50 to cause the wiper blades 28, 30 to operate with a desired wiping cycle.

The rain sensor 98 is placed on a surface of the windshield glass 12 inside a vehicle cabin to detect water on a windshield glass 12 surface and outputs a signal that corresponds to the amount of water on the windshield glass 12 surface. The rain sensor 98 is connected to the microcomputer 58 via the main ECU 92.

The rain sensor 98 includes, for example, an LED which is an infrared light-emitting element, a photodiode which is a light-receiving element, a lens that forms an infrared optical path, and a control circuit. An infrared ray emitted by the LED is totally reflected by the windshield glass 12. When there are water droplets (moisture) on the surface of the windshield glass 12, part of the infrared ray passes through the water droplets to the outside, resulting in a reduced amount of reflection at the windshield glass 12. As a result, the amount of light entering the photodiode, which is the light-receiving element, decreases. In the present embodiment, the amount of rain is calculated from the decrease in the amount of the infrared ray received by the photodiode and used for the control of the wiper drive device 10.

An in-vehicle camera 94 for obtaining an image data of forward of the vehicle is placed on the windshield glass 12 inside the cabin. The image data obtained by the in-vehicle camera 94 is used for control of the vehicle in automated driving or the like. The in-vehicle camera 94 in the present embodiment is a stereo camera that includes a right imaging portion 94R and a left imaging portion 94L to enable calculation of a distance to a subject from the image data obtained. The in-vehicle camera may not be a stereo camera if the vehicle is provided with a device, such as a millimeter-wave radar, capable of detecting an obstacle or the like forward of the vehicle and detecting a distance to the obstacle.

In the present embodiment, the rain sensor 98 and the in-vehicle camera 94 are connected to the main ECU 92. The main ECU 92 outputs a command signal to the wiper motor control circuit 22 for operating the wiper drive device 10 based on a signal from the rain sensor 98. The main ECU 92 also controls the automated driving of the vehicle based on the image data obtained by the in-vehicle camera 94.

As illustrated in FIG. 1, the rain sensor 98 and the in-vehicle camera 94 are placed in a function area 96 in or near an upper middle portion of the windshield glass 12 in the present embodiment. The function area 96 is a predefined range that can cover a range of detection of the rain sensor 98 and a field of view of imaging of the in-vehicle camera 94.

Figure 2:
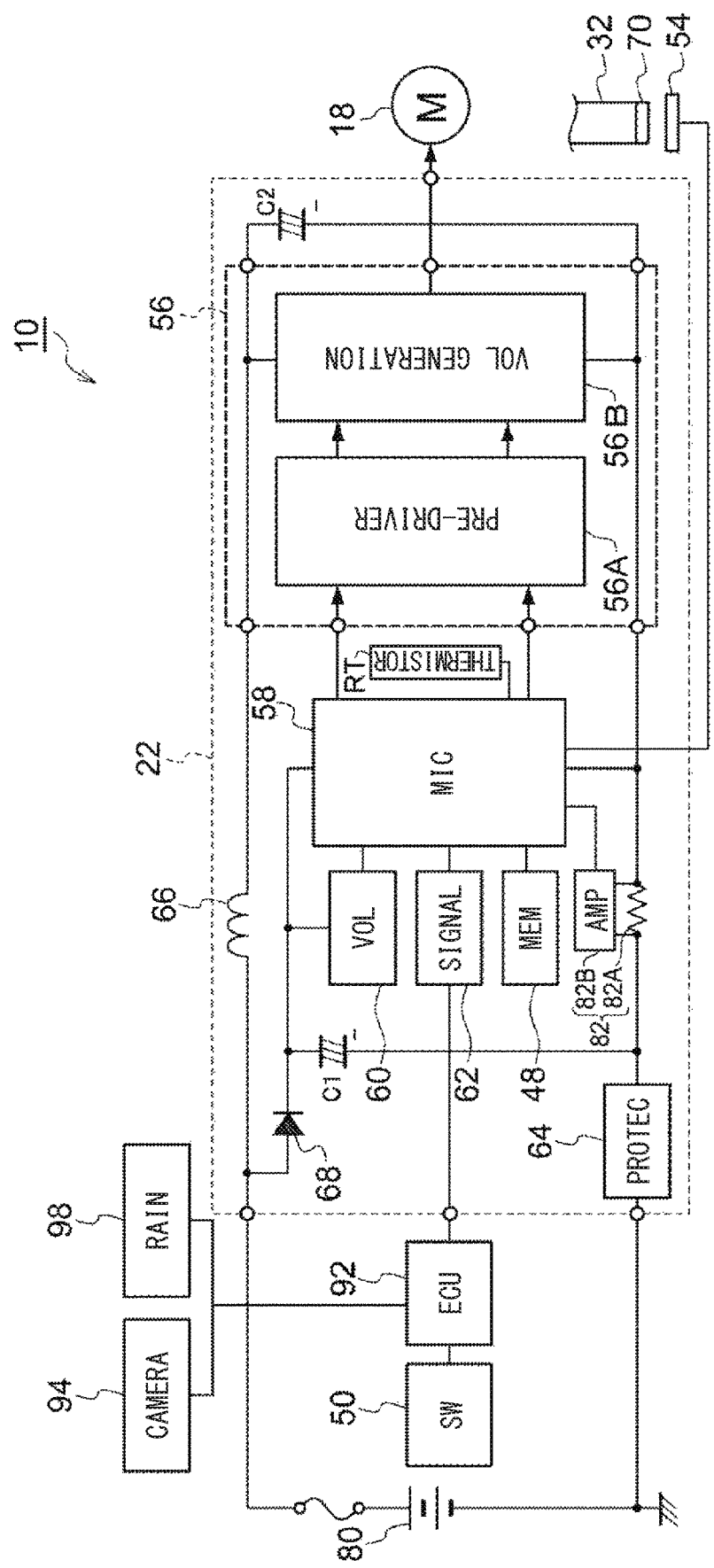
FIG. 2 is a block diagram schematically illustrating an example configuration of the wiper drive device according to the first embodiment of the present disclosure.

FIG. 2 is a block diagram schematically illustrating an example configuration of the wiper drive device 10 according to the present embodiment. The wiper drive device 10 illustrated in FIG. 2 includes the drive circuit 56, which generates the voltage to be applied to a terminal of the winding of the wiper motor 18, and the wiper motor control circuit 22, which includes the microcomputer 58 that controls turning on and off a switching element included in the drive circuit 56. The microcomputer 58 is supplied with electric power from the battery 80 via a diode 68. The voltage of the electric power from the battery 80 is detected by a voltage detection circuit 60 disposed between the diode 68 and the microcomputer 58. The voltage detection circuit 60 outputs a detection result to the microcomputer 58. An electrolytic capacitor C1 is provided with one end connected across the diode 68 and the microcomputer 58 and the other end (−) grounded. The electrolytic capacitor C1 is a capacitor for stabilizing the power supply to the microcomputer 58. The electrolytic capacitor C1 protects the microcomputer 58 by, for example, storing a sudden high voltage such as a surge and discharging to the grounding region.

The microcomputer 58 receives a signal from the wiper switch 50 for providing an instruction on the rotational speed of the wiper motor 18 via the main ECU 92 and a signal input circuit 62.

The microcomputer 58 is connected to the rotary angle sensor 54, which detects the magnetic field of the sensor magnet 70 that changes with the rotation of the output shaft 32. The microcomputer 58 determines the positions of the wiper blades 28, 30 on the windshield glass 12 by calculating the rotary angle of the output shaft based on a signal output by the rotary angle sensor 54.

The microcomputer 58 references data stored in a memory 48 of the rotational speed of the wiper motor 18 specified in association with the positions of the wiper blades 28, 30. Based on the referenced data, the microcomputer 58 controls the drive circuit 56 to cause the wiper motor 18 to operate at the number of revolutions corresponding to the determined positions of the wiper blades 28, 30.

The drive circuit 56 includes a pre-driver 56A and a voltage generation circuit 56B. The pre-driver 56A generates a drive signal for turning on and off a switching element of the voltage generation circuit 56B from a control signal output by the microcomputer 58 to control the drive circuit 56. The voltage generation circuit 56B generates a voltage to be applied to the coil of the wiper motor 18 by operating the switching element in response to the drive signal output from the pre-driver 56A. The drive circuit 56 is configured differently depending on whether the wiper motor 18 is a brushless motor or brushed motor, as described below. A brushed motor is a motor having at least one brush.

In the present embodiment, a reverse connection protection circuit 64 and a noise prevention coil 66 are disposed between the battery 80, which is the power source, and the drive circuit 56. An electrolytic capacitor C2 is provided in parallel to the drive circuit 56. The noise prevention coil 66 is an element for inhibiting noise generated by switching of the drive circuit 56.

The electrolytic capacitor C2 is an element for mitigating noise generated by the drive circuit 56 and for inhibiting an excessive current from flowing through the drive circuit 56 by storing a sudden high voltage such as a surge and discharging to a grounding region.

The reverse connection protection circuit 64 is a circuit for protecting constituent elements of the wiper drive device 10 when the connection of a positive electrode and negative electrode of the battery 80 illustrated in FIG. 2 is reversed. The reverse connection protection circuit 64 is configured by using, for example, a diode-connected FET with a drain and gate thereof connected.

A chip thermistor RT is implemented on a board of the wiper drive device 10 according to the present embodiment for detecting the temperature of the board as a resistance value. The chip thermistor RT used in the present embodiment is, for example, an NTC thermistor, which decreases the resistance as the temperature increases. Alternatively, a PTC thermistor, which increases the resistance value as the temperature increases, may be used together with an inverting circuit. NTC represents negative temperature coefficient. PTC represents positive temperature coefficient.

The chip thermistor RT configures a type of voltage divider. An output end of the voltage divider outputs voltage that changes based on the resistance value of the chip thermistor RT. The microcomputer 58 calculates the temperature of the board of the wiper drive device 10 based on the voltage output from the output end of the voltage divider of the chip thermistor RT. When the temperature exceeds a predefined temperature threshold value, the microcomputer 58 performs processing for stopping the operation of the wiper drive device 10 as described below.

A current detector 82 is provided between sources of switching elements of the voltage generation circuit 56B and the battery 80 for detecting current of the voltage generation circuit 56B. The current detector 82 includes a shunt resistor 82A having a resistance value of about 0.2 mΩ to several Ω and an amplifier 82B. The amplifier 82B detects a potential difference across the ends of the shunt resistor 82A that changes with the current of the voltage generation circuit 56B. The amplifier 82B amplifies a signal of the detected potential difference. The microcomputer 58 calculates an electric current value of the voltage generation circuit 56B from a signal output by the amplifier 82B. When the current value exceeds a predefined threshold value, the microcomputer 58 performs processing for stopping the operation of the wiper drive device 10 as described below.

Figure 3:
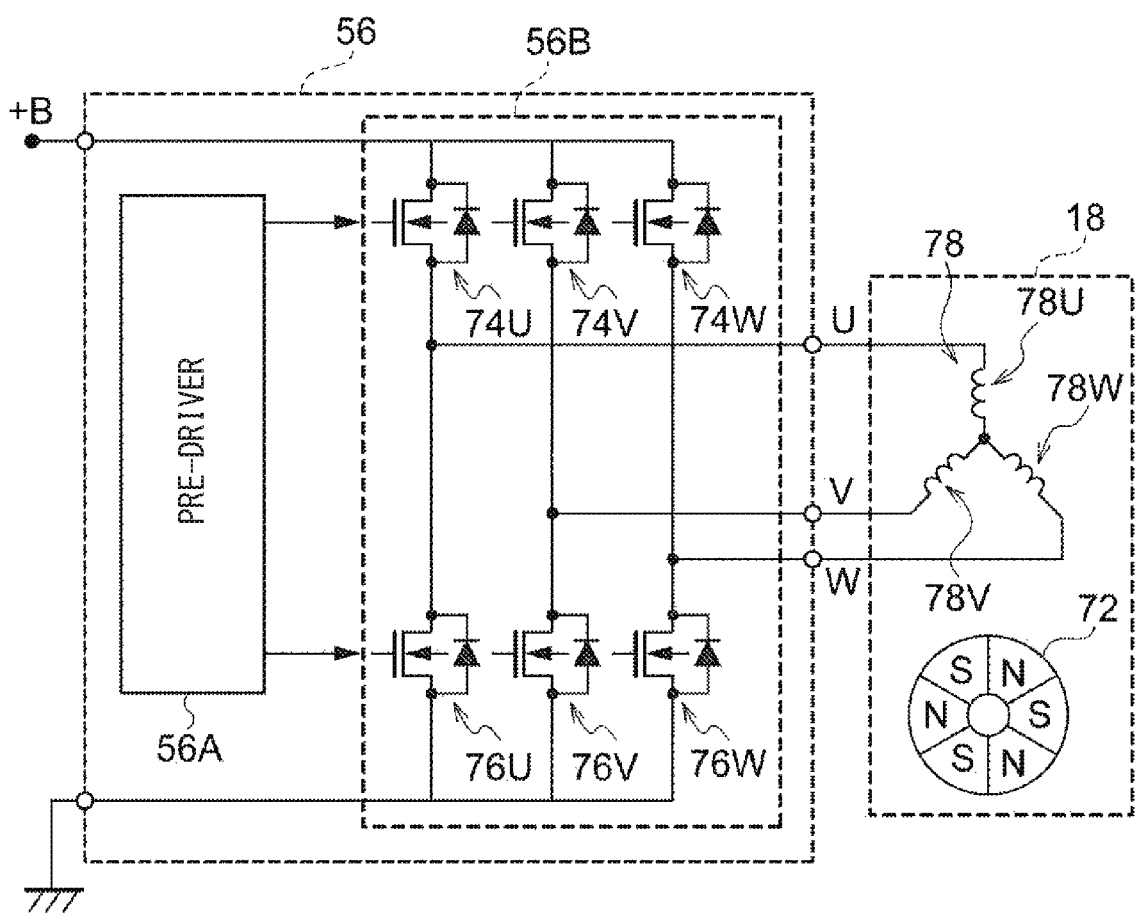
FIG. 3 is a block diagram of an example of a drive circuit for use when a wiper motor according to the first embodiment of the present disclosure is a brushless motor.

FIG. 3 is a block diagram of an example of the drive circuit 56 for use when the wiper motor 18 is a brushless motor. The voltage generation circuit 56B is configured by using a three-phase (including a U phase, a V phase, and a W phase) inverter.

When the wiper motor 18 is a brushless motor, its rotation control requires generation of voltage that approximates three-phase AC having phases corresponding to the positions of magnetic poles of a permanent magnet in a rotating rotor 72 and application of the generated voltage to coils 78U, 78V, and 78W of a stator 78. Upon application of the voltage, the coils 78U, 78V, and 78W generate a rotating magnetic field that rotates the rotor 72. The rotor 72 thus rotates based on the rotating magnetic field.

A Hall sensor, including a Hall element, or the like (not shown) detects change of the magnetic field of the rotor 72 or the sensor magnet that includes magnetic poles that correspond to those of the rotor 72. The microcomputer 58 calculates the positions of the magnetic poles of the rotor 72 from the detected change of the magnetic field.

The microcomputer 58 receives a signal from the wiper switch 50 via the main ECU 92 for providing an instruction on the rotational speed of the wiper motor 18 (the rotor 72). The microcomputer 58 calculates the phases of voltage to be applied to the coils of the wiper motor 18 based on the positions of the magnetic poles of the rotor 72. The microcomputer 58 generates a control signal for controlling the drive circuit 56 based on the calculated phases and the rotational speed of the rotor 72 in accordance with the instruction from the wiper switch 50. The microcomputer 58 outputs the generated control signal to the pre-driver 56A.

The pre-driver 56A generates a drive signal based on the received control signal to operate the switching elements of the voltage generation circuit 56B and outputs the generated drive signal to the voltage generation circuit 56B.

As illustrated in FIG. 3, the voltage generation circuit 56B includes three N-type FET 74U, 74V, and 74W (hereinafter referred to as the FETs 74U, 74V, and 74W), which are upper switching elements, and three N-type field-effect transistors 76U, 76V, and 76W (hereinafter referred to as the FETs 76U, 76V, and 76W), which are lower switching elements. When there is no need to distinguish the FETs 74U, 74V, and 74W from one another or the FETs 76U, 76V, and 76W from one another, they are referred to as the FETs 74 or the FETs 76. When it is necessary to distinguish them individually, the signs U, V, and W are used. FET is an abbreviation of field-effect transistors.

Of the FETs 74 and FETs 76, a source of the FET 74U and a drain of the FET 76U are connected to a terminal of the coil 78U; a source of the FET 74V and a drain of the FET 76V are connected to a terminal of the coil 78V; a source of the FET 74W and a drain of the FET 76W are connected to a terminal of the coil 78W.

Gates of the FETs 74 and FETs 76 are connected to the pre-driver 56A and receive drive signals. The FETs 74 and the FETs 76 are turned on when the respective gates receive drive signals at an H level, allowing current to flow from the respective drains to the respective sources. The FETs 74 and the FETs 76 are turned off when the respective gates receive drive signals at an L level, allowing no current to flow from the respective drains to the respective sources.

PWM that causes each of the FETs 74, 76 of the voltage generation circuit 56B to turn on and off in response to a drive signal is used to generate voltage that changes with the positions of the magnetic poles of the rotor 72 and causes the rotor 72 to rotate at the rotational speed in accordance with the instruction from the wiper switch 50. PWM represents pulse width modulation.

Figure 4:
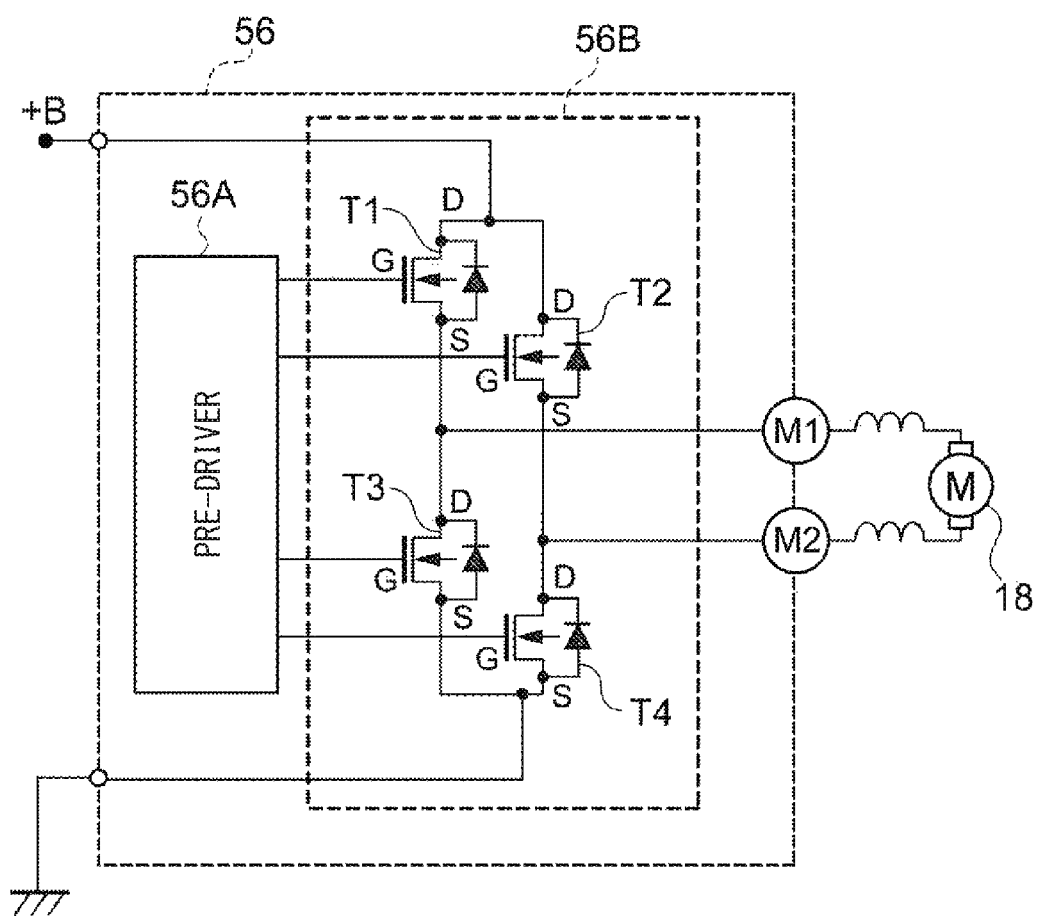
FIG. 4 is a block diagram of an example of the drive circuit for use when the wiper motor according to the first embodiment of the present disclosure is a brushed motor.

FIG. 4 is a block diagram of an example of the drive circuit 56 for use when the wiper motor 18 is a brushed motor. As illustrated in FIG. 4, the voltage generation circuit 56B includes transistors T1, T2, T3, and T4, which are N-type FETs, as the switching elements. Drains of the transistors T1, T2 are connected to the battery 80 via the noise prevention coil 66. Sources of the transistors T1 T2 are connected to respective drains of the transistors T3 and T4. Sources of the transistors T3, T4 are grounded.

The source of the transistor T1 and the drain of the transistor T3 are connected to one end of winding of the wiper motor 18. The source of the transistor T2 and the drain of the transistor T4 are connected to the other end of the winding of the wiper motor 18.

When drive signals at the H level are input to the gates of the transistors T1 and T4, the transistors T1 and T4 are turned on, passing current through the wiper motor 18 that causes the wiper blades 28, 30 to operate, for example, clockwise when viewed from inside of the cabin. Furthermore, by rapidly turning on and turning off one of the transistors T1 and T4 using PWM while keeping the other one on, the voltage of the current can be modulated.

When drive signals at the H level are input to the gates of the transistors T2 and T3, the transistors T2 and T3 are turned on, passing current through the wiper motor 18 that causes the wiper blades 28, 30 to operate, for example, counterclockwise when viewed from inside of the cabin. Furthermore, by rapidly turning on and turning off one of the transistors T2 and T3 using PWM while keeping the other one on, the voltage of the current can be modulated.

Figure 5:
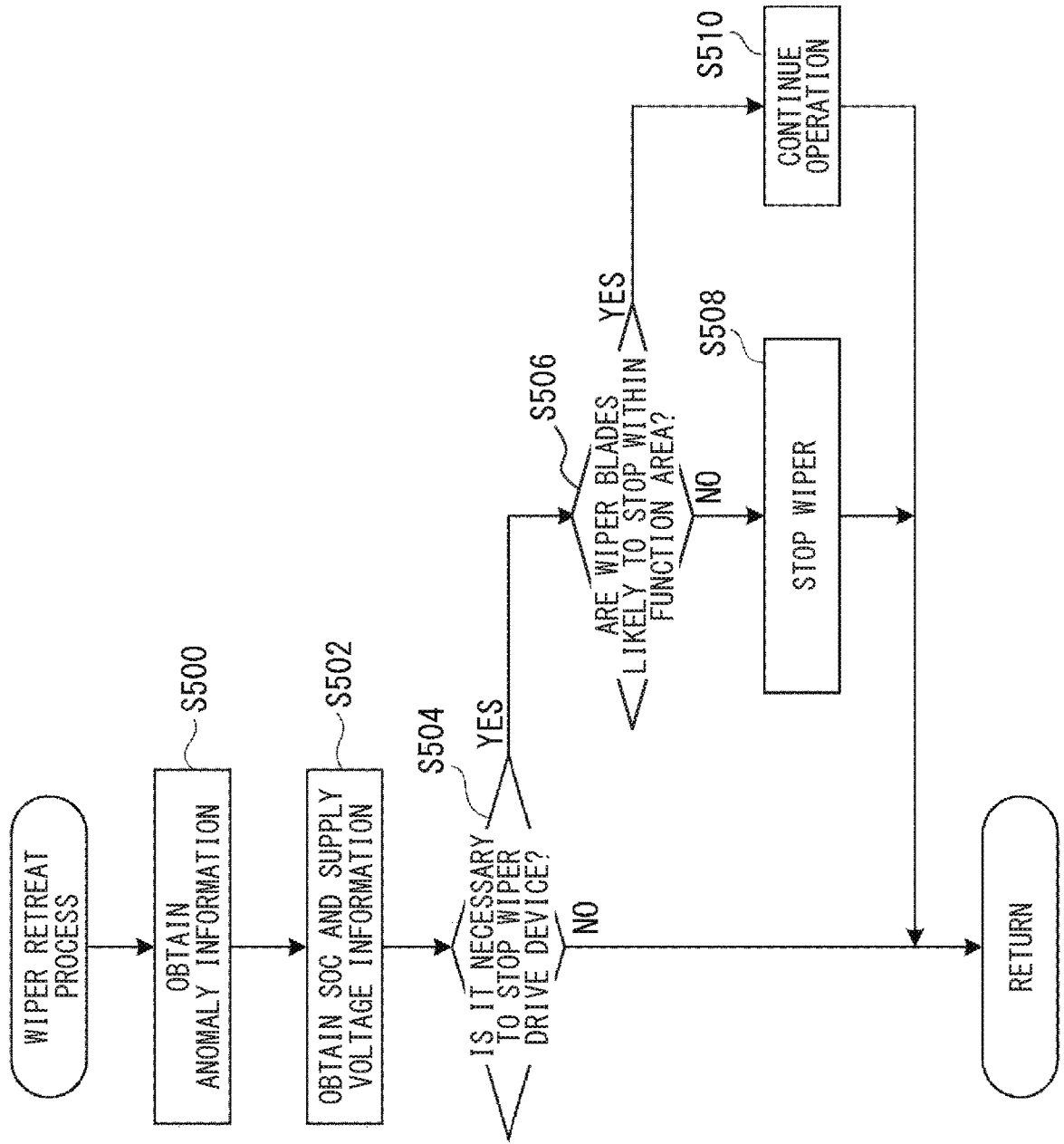
FIG. 5 is a flowchart describing an example wiper retreat process of the wiper drive device according to the first embodiment of the present disclosure.

FIG. 5 is a flowchart describing an example wiper retreat process of the wiper drive device 10 according to the present embodiment. Anomaly information of the wiper drive device 10 is obtained in S500. Obtainable anomaly information includes that on cases such as when, for example, the temperature of the board of the wiper drive device 10 detected by the chip thermistor RT exceeds a predefined temperature threshold value, or when the current of the voltage generation circuit 56B detected by the current detector 82 exceeds a predefined current threshold value.

Information on supply voltage to the wiper drive device 10 is obtained from the voltage detection circuit 60 in S502. Information on an SOC (state of charge) of the battery 80, which is the amount of electricity stored therein, is obtained through the main ECU also in S502. The main ECU is connected to a charge/discharge controller (not shown) of the battery 80 and obtains the SOC information of the battery 80 from the charge/discharge controller.

It is determined in S504 whether it is necessary to stop the wiper drive device 10 based on the anomaly information, SOC information, and supply voltage information obtained. For example, when the current of the voltage generation circuit 56B exceeds the current threshold value, when the temperature of the board of the wiper drive device 10 exceeds the temperature threshold value, when the SOC is equal to or smaller than a predefined reference value, or when the supply voltage is equal to or smaller than a predefined lower limit value, it is determined that there is an anomaly that hinders the wiping operation of the wiper drive device 10 and thus the affirmative determination is made in this step. If the determination made in S504 is in the negative, the process returns.

If the determination made in S504 is in the affirmative, it is determined in S506 whether the wiper blades 28, 30 are likely to stop within the function area 96. As described above, a rotational speed of the output shaft 32, which is related to the positions on the windshield glass 12 and the wiping speeds of the wiper blades 28, 30, are calculated from the rotary angle of the output shaft 32 detected by the rotary angle sensor 54. The microcomputer 58 determines whether the stop positions of the wiper blades 28, 30 are within the function area 96 based on the current positions of the wiper blades 28, 30 and the rotational speed of the output shaft 32.

If the determination in S506 is in the affirmative, the operation of the wiper drive device 10 is continued in S510 and the process returns. If the determination in S506 is in the negative, the wiper drive device 10 is stopped in S508 and the process returns.

Figure 6:
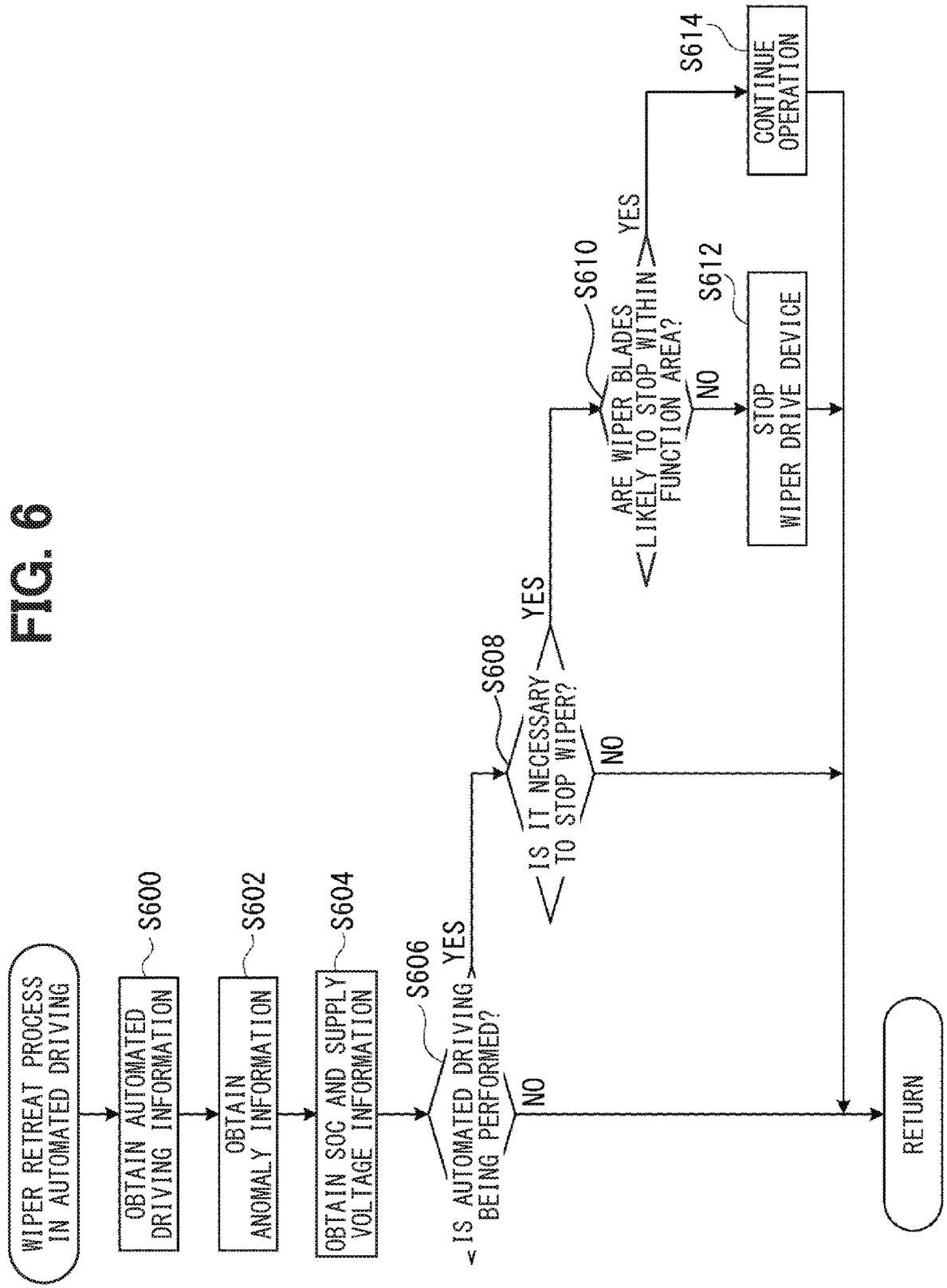
FIG. 6 is a flowchart describing an example wiper retreat process for use when automated driving of a vehicle is performed in the first embodiment of the present disclosure.

FIG. 6 is a flowchart describing an example wiper retreat process for use when the automated driving of the vehicle is performed. Automated driving information, such as image information, for the automated driving is obtained from the in-vehicle camera 94 and other devices in S600.

Anomaly information of the wiper drive device 10 is obtained in S602. Obtainable anomaly information includes that on cases such as when, for example, the temperature of the board of the wiper drive device 10 detected by the chip thermistor RT exceeds a predefined temperature threshold value, or when the current of the voltage generation circuit 56B detected by the current detector 82 exceeds a predefined current threshold value.

Information on the SOC (state of charge) of the battery 80, which is the amount of electricity stored therein, is obtained through the main ECU in S604. Information on supply voltage to the wiper drive device 10 is obtained from the voltage detection circuit 60 also in S604.

It is determined in S606 whether the automated driving is being performed. If the automated driving is not performed, the negative determination is made and the process returns.

If the determination made in S606 is in the affirmative, it is determined in S608 whether it is necessary to stop the wiper drive device 10 based on the anomaly information, SOC information, and supply voltage information obtained. For example, when the current of the voltage generation circuit 56B exceeds the current threshold value, when the temperature of the board of the wiper drive device 10 exceeds the temperature threshold value, when the SOC is equal to or smaller than a predefined reference value, or when the supply voltage is equal to or smaller than a predefined lower limit value, it is determined that there is an anomaly that hinders the wiping operation of the wiper drive device 10 and thus the affirmative determination is made in this step. If the determination made in S608 is in the negative, the process returns.

If the determination made in S608 is in the affirmative, it is determined in S610 whether the wiper blades 28, 30 are likely to stop within the function area 96.

If the determination in S610 is in the affirmative, the operation of the wiper drive device 10 is continued in S614 and the process returns. If the determination in S610 is in the negative, the wiper drive device 10 is stopped in S612 and the process returns.

Figure 7:
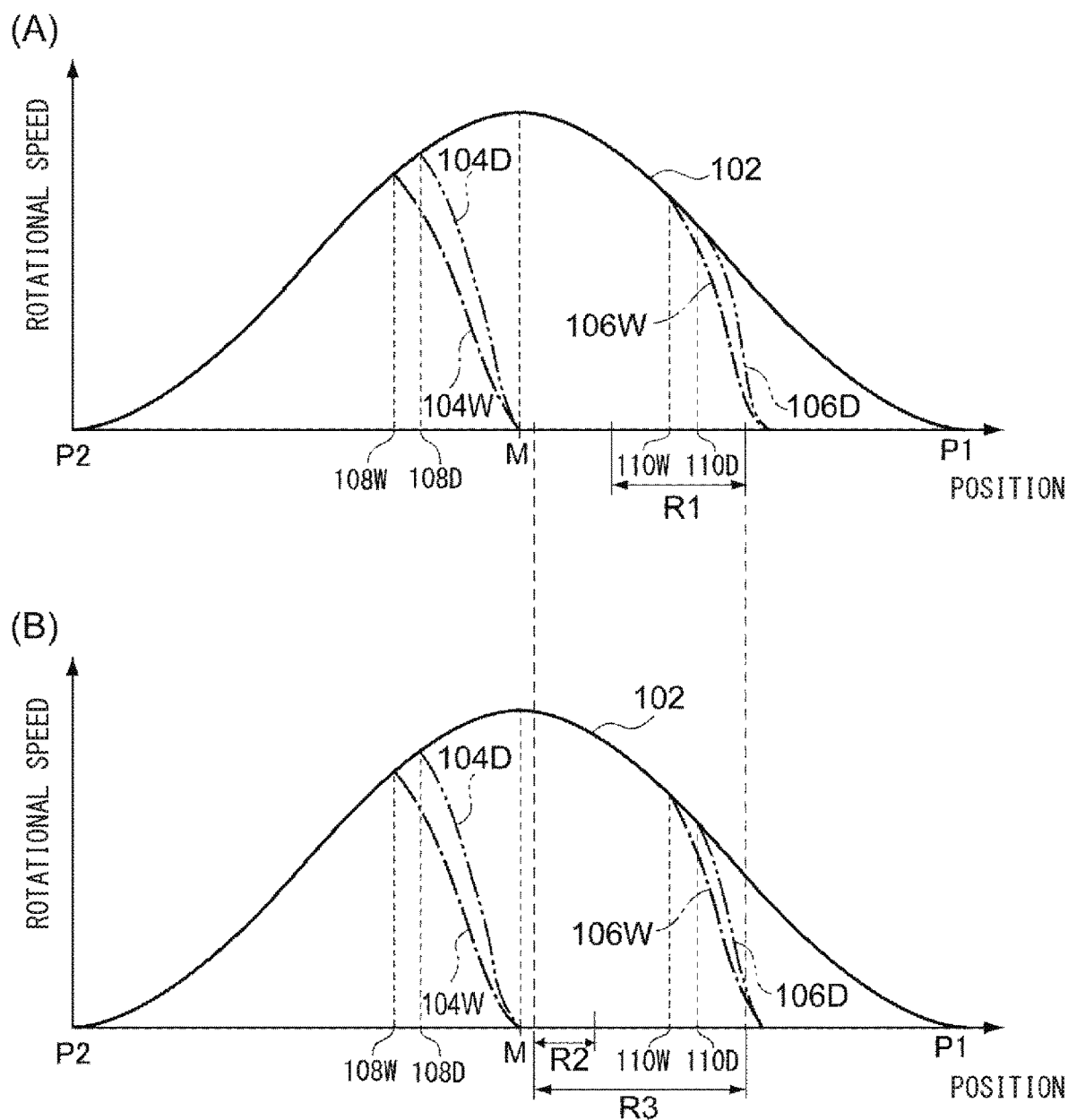
FIG. 7 is a graph describing example speed maps in the wiper drive device according to the first embodiment of the present disclosure, the speed maps each defining rotational speed of an output shaft of the wiper motor in association with the position of a wiper blade on a windshield glass.

FIG. 7 presents graphs showing example speed maps 102 in the wiper drive device 10 according to the present embodiment. The speed maps 102 each define the rotational speed of the output shaft 32 of the wiper motor 18 in association with the position of the wiper blade 28 or the wiper blade 30 on the windshield glass 12. The speed maps 102 in FIG. 7 are for the high speed operation mode. As illustrated in each of the speed maps 102 in (A) and (B) in FIG. 7, when the wiping operation is started at the lower reversing position P2, the rotational speed of the output shaft 32 gradually increases from "zero" until it reaches a relative maximum at an intermediate position M between the lower reversing position P2 and the upper reversing position P1. The rotational speed of the output shaft 32 then decreases as the wiper blade 28 or the wiper blade 30 approaches the upper reversing position P1 until it reaches "zero" at the upper reversing position P1. The microcomputer 58 references the speed maps 102 and speed maps 112 to be described below and perform control for causing the drive circuit 56 to generate voltage that enables the output shaft 32 to rotate at a rotational speed that corresponds to the positions of the wiper blades 28, 30 on the windshield glass 12 based on the rotary angle of the output shaft 32 detected by the rotary angle sensor 54.

The speed map of (A) in FIG. 7 is for the wiper blade 28, which wipes the windshield glass 12 on the left-hand side as viewed from inside of the cabin. The speed map of (B) in FIG. 7 is for the wiper blade 30, which wipes the windshield glass 12 on the right-hand side as viewed from inside of the cabin. The wiper blades 28, 30 perform the wiping operation using the single output shaft 32 in the present embodiment. Thus, the speed maps 102 of (A) and (B) in FIG. 7 are the same.

In (A) in FIG. 7, R1 denotes a range in which the wiper blade 28 is likely to interfere with the function area 96. In (B) in FIG. 7, R2 denotes a range in which the wiper blade 30 is likely to interfere with the function area 96. The wiper blades 28, 30 are thus controlled so as not to stop in a range R3, which includes R1 and R2, in the present embodiment.

Resistance generated between the wiper blades 28, 30 and the windshield glass 12 surface during the wiping operation is affected by the presence of water droplets on the windshield glass 12. When water droplets are present on the windshield glass 12 surface, the resistance to the wiping operation of the wiper blades 28, 30 decreases. When the windshield glass 12 surface is dry with no water droplets thereon, resistance to the wiping operation of the wiper blades 28, 30 increases.

Decreased resistance to the wiping operation leads to a longer time taken from when the power supply to the wiper motor 18 is stopped until the wiper blades 28, 30 come to a stop than increased resistance to the wiping operation. Increased resistance to the wiping operation leads to a shorter time taken from when the power supply to the wiper motor 18 is stopped until the wiper blades 28, 30 come to a stop than decreased resistance to the wiping operation.

The microcomputer 58 infers the stop positions of the wiper blades 28, 30 from the current positions of the wiper blades 28, 30 and the rotational speed of the output shaft 32, which is related to the wiping speeds of the wiper blades 28, 30. The microcomputer 58 makes the inference also from the time taken for the wiper blades 28, 30 to come to a stop, which is lengthened or shortened depending on the presence of the water droplets on the windshield glass 12. An example case in the present embodiment is that water droplets are detected on the windshield glass 12 surface by the rain sensor 98 and that the wiper motor 18 is assumed to be stopped due to an anomaly of the supply voltage or the like at a timing while the wiper blades 28, 30 perform the wiping operation from the lower reversing positions P2 toward the upper reversing positions P1 in the high speed operation mode. In this case, it is determined that the wiper arms 24, 26 and the wiper blades 28, 30 are not likely to interfere with the function area 96 if the positions of the wiper blades 28, 30 at the timing when the wiper motor 18 is assumed to be stopped due to the anomaly are before stop limit points 108W or between stop limit points 110W and the upper reversing positions P1.

Another example case is that water droplets are not detected on the windshield glass 12 surface by the rain sensor 98 and that the wiper motor 18 is assumed to be stopped due to an anomaly at a timing while the wiper blades 28, 30 perform the wiping operation from the lower reversing positions P2 toward the upper reversing positions P1 in the high speed operation mode. In this case, it is determined that the wiper arms 24, 26 and the wiper blades 28, 30 are not likely to interfere with the function area 96 if the positions of the wiper blades 28, 30 at the timing when the wiper motor 18 is assumed to be stopped due to the anomaly are before stop limit points 108D or between stop limit points 110D and the upper reversing positions P1.

In the present embodiment, if it is determined that the wiper arms 24, 26 and the wiper blades 28, 30 are not likely to interfere with the function area 96, the wiper motor 18 is stopped at the timing when the wiper motor 18 is assumed to be stopped.

Another example case in the present embodiment is that water droplets are detected on the windshield glass 12 surface by the rain sensor 98 and that the wiper motor 18 is assumed to be stopped due to an anomaly of the supply voltage or the like at a timing while the wiper blades 28, 30 perform the wiping operation from the lower reversing positions P2 toward the upper reversing positions P1 in the high speed operation mode. In this case, it is determined that the wiper blades 28, 30 are likely to interfere with the function area 96 if the positions of the wiper blades 28, 30 at the timing when the wiper motor 18 is assumed to be stopped due to the anomaly are between the stop limit points 108W and the stop limit points 110W.

Another example case is that water droplets are not detected on the windshield glass 12 surface by the rain sensor 98 and that the wiper motor 18 is assumed to be stopped due to an anomaly while the wiper blades 28, 30 perform the wiping operation from the lower reversing positions P2 toward the upper reversing positions P1 in the high speed operation mode. In this case, it is determined that the wiper arms 24, 26 and the wiper blades 28, 30 are likely to interfere with the function area 96 if the positions of the wiper blades 28, 30 at the timing when the wiper motor 18 is assumed to be stopped due to the anomaly are between the stop limit points 108D and the stop limit points 110D.

In the present embodiment, if it is determined that the wiper blades 28, 30 are likely to interfere with the function area 96, the interference of the wiper arms 24, 26 and the wiper blades 28, 30 with the function area 96 is inhibited by causing the wiper motor 18 to operate until, for example, the wiper blades 28, 30 are near the upper reversing positions P1. Alternatively, the interference of the wiper arms 24, 26 and the wiper blades 28, 30 with the function area 96 is inhibited by immediately stopping the operation of the wiper motor 18 using brake energization or the like described below.

As an alternative to inference of the stop positions, the wiper arms 24, 26 and the wiper blades 28, 30 may be stopped so as not to interfere with the function area 96 by decelerating the rotational speed of the output shaft 32 according to deceleration maps 104W, 104D, 106W and 106D described in FIG. 7. For example, performing control as described below produces substantially the same action as determining whether the stop positions of the wiper blades 28, 30 are likely to interfere with the function area 96 based on the current positions of the wiper blades 28, 30 and the rotational speed of the output shaft 32, which is related to the wiping speed of the wiper blades 28, 30.

For example, to stop the wiping operation of the wiper blades 28, 30 due to an anomaly of the supply voltage or the like during the wiping operation from the lower reversing positions P2 toward the upper reversing positions P1 when water droplets are detected on the windshield glass 12 surface by the rain sensor 98, the rotational speed of the output shaft 32 is reduced in accordance with the deceleration map 104W before the wiper blades 28, 30 reach the stop limit points 108W. The wiper arms 24, 26 and the wiper blades 28, 30 are thereby stopped without interfering with the function area 96.

In another example, to stop the wiping operation of the wiper blades 28, 30 due to an anomaly of the supply voltage or the like during the wiping operation from the lower reversing positions P2 toward the upper reversing positions P1 when water droplets are not detected on the windshield glass 12 surface by the rain sensor 98, the rotational speed of the output shaft 32 is reduced in accordance with the deceleration map 104D before the wiper blades 28, 30 reach the stop limit points 108D, which are closer to the upper reversing positions P1 than are the stop limit points 108W. The wiper arms 24, 26 and the wiper blades 28, 30 are thereby stopped without interfering with the function area 96.

If the wiper blades 28, 30 are beyond the stop limit points 108W, closer to the upper reversing positions P1, at the timing when the microcomputer 58 determines to stop the wiping operation of the wiper blades 28, 30 due to a supply voltage anomaly or the like, the rotational speed of the output shaft 32 is reduced in accordance with the deceleration map 106W when the wiper blades 28, 30 move past the stop limit points 110W. The wiper arms 24, 26 and the wiper blades 28, 30 are thereby stopped without interfering with the function area 96.

Similarly, if the wiper blades 28, 30 are beyond the stop limit points 108D, closer to the upper reversing positions P1, at the timing when the microcomputer 58 determines to stop the wiping operation of the wiper blades 28, 30, the rotational speed of the output shaft 32 is reduced in accordance with the deceleration map 106D when the wiper blades 28, 30 move past the stop limit points 110D. The wiper arms 24, 26 and the wiper blades 28, 30 are thereby stopped without interfering with the function area 96.

Figure 8:
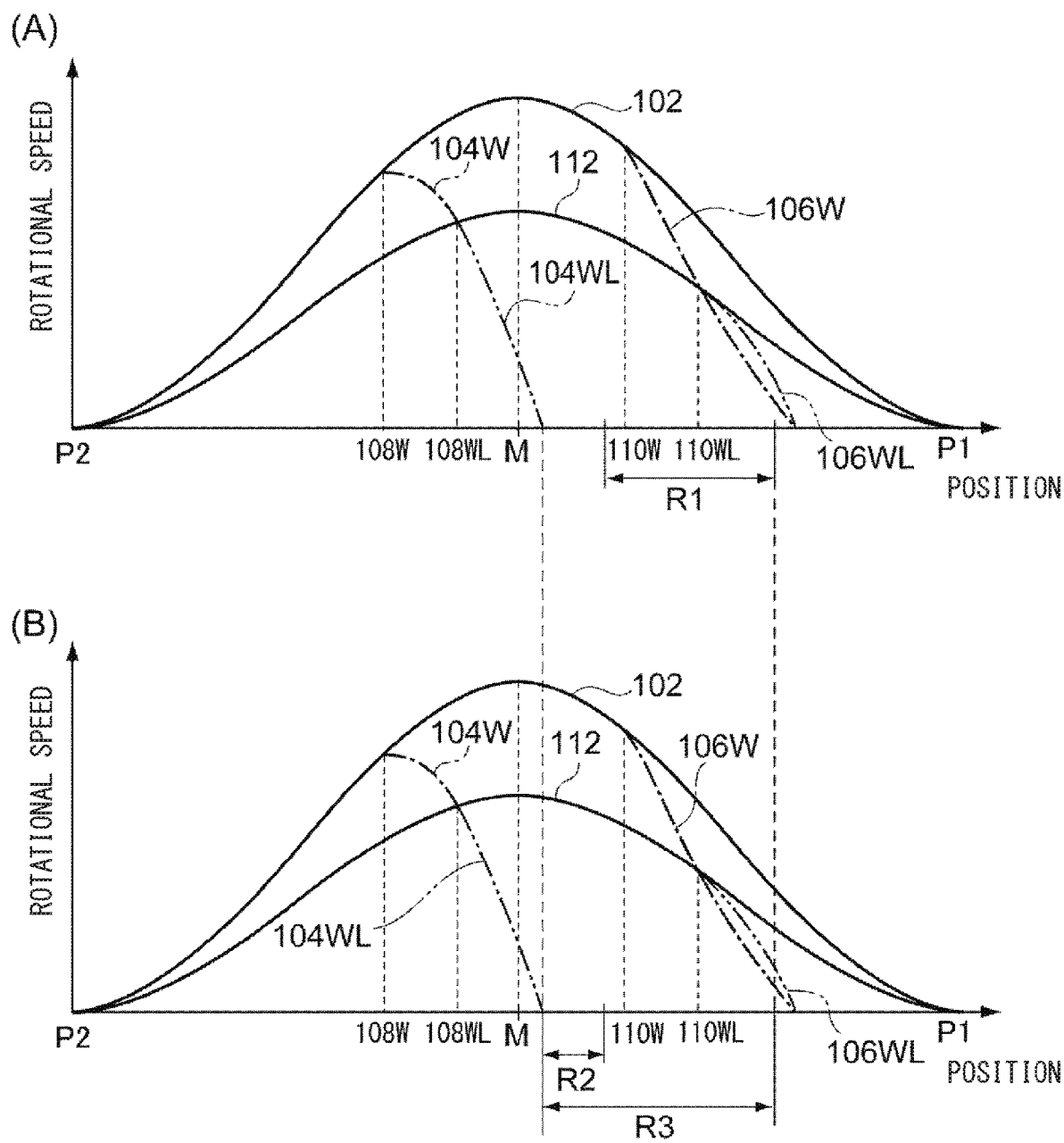
FIG. 8 is a schematic graph comparing the speed maps in a high speed operation mode to speed maps in a low speed operation mode in the first embodiment of the present disclosure.

FIG. 8 presents example graphs comparing the speed maps 102 in the high speed operation mode to the speed maps 112 in a low speed operation mode. The rotational speed of the output shaft 32 is slower in the speed maps 112 in the low speed operation mode than in the speed maps 102 in the high speed operation mode.

An example case in the present embodiment is that water droplets are detected on the windshield glass 12 surface by the rain sensor 98 and that the wiper motor 18 is assumed to be stopped due to an anomaly of the supply voltage or the like at a timing while the wiper blades 28, 30 perform the wiping operation from the lower reversing positions P2 toward the upper reversing positions P1 in the low speed operation mode. In this case, it is determined that the wiper arms 24, 26 and the wiper blades 28, 30 are not likely to interfere with the function area 96 if the positions of the wiper blades 28, 30 at the timing when the wiper motor 18 is assumed to be stopped due to the anomaly are before stop limit points 108WL or between stop limit points 110WL and the upper reversing positions P1.

In the present embodiment, if it is determined that the wiper arms 24, 26 and the wiper blades 28, 30 are not likely to interfere with the function area 96, the wiper motor 18 is stopped at the timing when the wiper motor 18 is assumed to be stopped.

Another example case in the present embodiment is that water droplets are detected on the windshield glass 12 surface by the rain sensor 98 and that the wiper motor 18 is assumed to be stopped due to an anomaly of the supply voltage or the like at a timing while the wiper blades 28, 30 perform the wiping operation from the lower reversing positions P2 toward the upper reversing positions P1 in the low speed operation mode. In this case, it is determined that the wiper arms 24, 26 and the wiper blades 28, 30 are likely to interfere with the function area 96 if the positions of the wiper blades 28, 30 at the timing when the wiper motor 18 is assumed to be stopped due to the anomaly are between the stop limit points 108WL and the stop limit points 110WL.

In the present embodiment, when it is determined that the wiper arms 24, 26 and the wiper blades 28, 30 are likely to interfere with the function area 96, the interference of the wiper arms 24, 26 and the wiper blades 28, 30 with the function area 96 is inhibited by causing the wiper motor 18 to operate until, for example, the wiper blades 28, 30 are near the upper reversing positions P1. Alternatively, the interference of the wiper arms 24, 26 and the wiper blades 28, 30 with the function area 96 is inhibited by immediately stopping the operation of the wiper motor 18 using brake energization or the like described below.

In the present embodiment, to stop the wiping operation of the wiper blades 28, 30 due to an anomaly of the supply voltage or the like during the wiping operation in the low speed operation mode from the lower reversing positions P2 toward the upper reversing positions P1 on the windshield glass 12 with water droplets present thereon, the rotational speed of the output shaft 32 is reduced in accordance with a deceleration map 104WL before the wiper blades 28, 30 reach the stop limit points 108WL. The wiper arms 24, 26 and the wiper blades 28, 30 are thereby stopped without interfering with the function area 96.

If, for example, the wiper blades 28, 30 are beyond the stop limit points 108WL, closer to the upper reversing positions P1, at the timing when the microcomputer 58 determines to stop the wiping operation of the wiper blades 28, 30 due to a supply voltage anomaly or the like during the wiping operation of the wiper blades 28, 30 in the low speed operation mode from the lower reversing positions P2 toward the upper reversing positions P1 on the windshield glass 12 with water droplets present thereon, the rotational speed of the output shaft 32 is reduced in accordance with the deceleration map 106WL when the wiper blades 28, 30 move past the stop limit points 110WL. The wiper arms 24, 26 and the wiper blades 28, 30 are thereby stopped without interfering with the function area 96.

While the deceleration map 104WL and the like for the low speed operation mode may have some commonalities with the deceleration map 104W for the high speed operation mode, the deceleration map 104WL and the like may be optimized for deceleration in the low speed operation mode, having a different form from the deceleration map 106W for the high speed operation mode, as in the deceleration map 106WL described in (B) in FIG. 8.

As described above, in the present embodiment, it is determined whether the wiper arms 24, 26 and the wiper blades 28, 30 are likely to interfere with the function area 96 when the wiper motor 18 is stopped due to an anomaly based on the stop limit points 108D, 108W, 108WL, 110D, 110W, and 110WL, which are determined in accordance with the wiping speed and the presence of water droplets on the windshield glass 12 surface. In the present embodiment, stop limit points may be determined in advance based on the rotational speed (i.e., wiping speed) and rotary angle (i.e., the positions of the wiper blades 28, 30) of the wiper motor 18, how wet the windshield glass 12 is, and the vehicle speed (i.e., the strength of wind during driving). The stop limit points may be stored in the memory 48 as threshold values for use to determine whether the wiper arms 24, 26 and the wiper blades 28, 30 are likely to stop in the function area 96.

The wiping operation of the wiper blades 28, 30 can be stopped by stopping the generation of voltage in the drive circuit 56, thereby stopping the passage of electricity through the wiper motor 18. In some cases, however, the wiper blades 28, 30 move due to inertia, which makes it difficult to control the wiper blades 28, 30 in accordance with the deceleration maps 104D, 104W, 104WL, 106D, 106W, 106WL illustrated in FIGS. 7 and 8.

In such cases, brake energization or regenerative brake is also used to actively stop the wiping operation of the wiper blades 28, 30.

When the wiper motor 18 is a brushed motor, the brake energization can be performed by making a short circuit between the brushes of the wiper motor 18. Specifically, in the voltage generation circuit 56B configuring the H bridge circuit illustrated in FIG. 4, the transistors T1 and T2 are turned on and the transistors T3 and T4 are turned off.

The brake energization can be also performed by turning on the transistor T3 and T4 while turning off the transistor T1 and T2 in the voltage generation circuit 56B illustrated in FIG. 4.

When the wiper motor 18 is a brushless motor, the brake energization can be performed by making a short circuit between the phases of the wiper motor 18. Specifically, in the voltage generation circuit 56B configuring the three-phase inverter illustrated in FIG. 3, the FETs 74U, 74V and 74W are turned on while the FETs 76U, 76V, and 76W are turned off.

The brake energization can be also performed by turning on the FET 76U, 76V, and 76W while turning off the FETs 74U, 74V, and 74W in the voltage generation circuit 56B illustrated in FIG. 3.

To apply regenerative brake when the wiper motor 18 is a brushed motor, the transistors T1 to T4 in the voltage generation circuit 56B illustrated in FIG. 3 are switched so as to pass electricity through the wiper motor 18 in a rotation direction opposite to that used before the application of the brake (reverse passage of electricity). The wiper motor 18 is thereby rotated in the direction opposite to that used before the application of the brake. Specifically, when the wiper motor 18 is operated with the transistors T1 and T4 turned on and the transistors T2 and T3 turned off, the transistors T2 and T3 are turned on and the transistors T1 and T4 are turned off to apply the regenerative brake.

When the wiper motor 18 is operated with the transistors T2 and T3 turned on and the transistors T1 and T4 turned off, the transistors T1 and T4 are turned on and the transistors T2 and T3 are turned off to apply the regenerative brake.

To apply the regenerative brake when the wiper motor 18 is a brushless motor, the reverse passage of electricity is also performed, requiring passing electricity in the opposite direction through each phase in coordination with the rotational speed of the rotor 72.

Figure 9A:
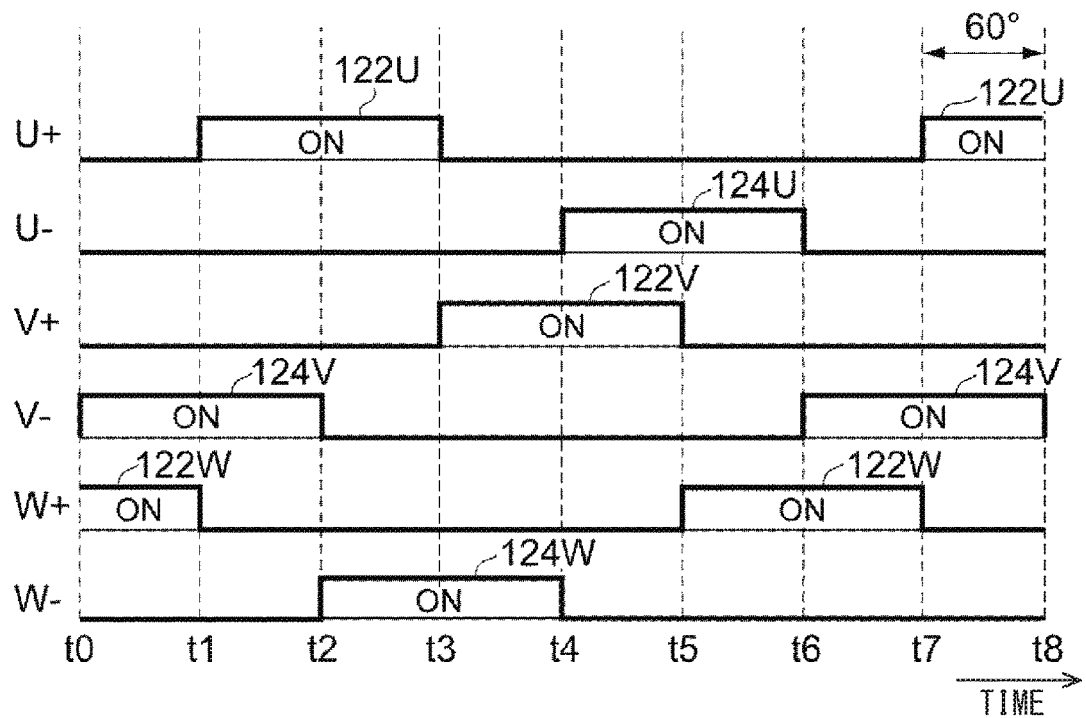
FIG. 9A is a time chart illustrating example timings for passage of electricity for rotating the brushless motor.

FIG. 9A is a time chart illustrating example timings for the passage of electricity for rotating the brushless motor. Passage of electricity 122U, 122V, and 122W and passage of electricity 124U, 124V, and 124W are indicated using rectangles in FIG. 9A, representing timings at which electricity is passed through the coils 78U, 78V, and 78W. While the passage of electricity 122U, 122V, 122W, 124U, 124V, 124W, 126U, 126V, 126W, 128U, 128V, and 128W are indicated using rectangles in FIGS. 9A and 9B for convenience, voltage is modulated into pulses using PWM and applied to the coils 78U, 78V, and 78W in the actual passage of electricity. The unit time used in FIGS. 9A and 9B (for example, the time from time t0 to time t1) is the time taken for the rotor 72 to rotate by 60° in terms of electrical angle. The timings at which to pass electricity in FIG. 9A correspond to the positions of the magnetic poles of the rotor 72 detected by a Hall sensor or the like (not shown).

From time t0 to time t1, the FET 74W and the FET 76V are turned on, passing electricity from the coil 78W to the coil 78V. From time t1 to time t2, the FET 74U and the FET 76V are turned on, passing electricity from the coil 78U to the coil 78V. From time t2 to time t3, the FET 74U and the FET 76W are turned on, passing electricity from the coil 78U to the coil 78W. From time t3 to time t4, the FET 74V and the FET 76W are turned on, passing electricity from the coil 78V to the coil 78W. From time t4 to time t5, the FET 74V and the FET 76U are turned on, passing electricity from the coil 78V to the coil 78U. From time t5 to time t6, the FET 74W and the FET 76U are turned on, passing electricity from the coil 78W to the coil 78U. From time t6 to time t7, the FET 74W and the FET 76V are turned on, passing electricity from the coil 78W to the coil 78V. From time t7 to time t8, the FET 74U and the FET 76V are turned on, passing electricity from the coil 78U to the coil 78V.

Figure 9B:
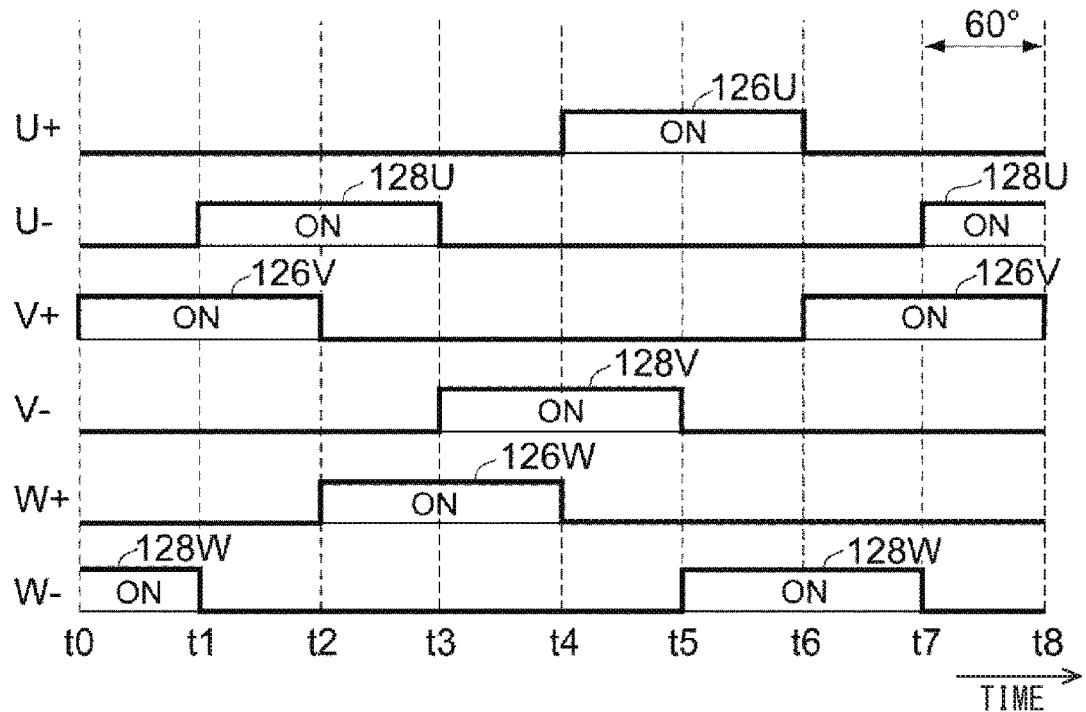
FIG. 9B is a time chart illustrating example timings for reverse passage of electricity through the brushless motor when regenerative brake is applied.

FIG. 9B is a time chart illustrating example timings for the reverse passage of electricity through the brushless motor when the regenerative brake is applied. The direction in which electricity is passed in FIG. 9B is opposite from the direction in which electricity is passed in FIG. 9A. Specifically, from time t0 to time t1, the FET 74V and the FET 76W are turned on, passing electricity from the coil 78V to the coil 78W. From time t1 to time t2, the FET 74V and the FET 76U are turned on, passing electricity from the coil 78V to the coil 78U. From time t2 to time t3, the FET 74W and the FET 76U are turned on, passing electricity from the coil 78W to the coil 78U. From time t3 to time t4, the FET 74W and the FET 76V are turned on, passing electricity from the coil 78W to the coil 78V. From time t4 to time t5, the FET 74U and the FET 76V are turned on, passing electricity from the coil 78U to the coil 78V. From time t5 to time t6, the FET 74U and the FET 76W are turned on, passing electricity from the coil 78U to the coil 78W. From time t6 to time t7, the FET 74V and the FET 76W are turned on, passing electricity from the coil 78V to the coil 78W. From time t7 to time t8, the FET 74V and the FET 76U are turned on, passing electricity from the coil 78V to the coil 78U.

In the regenerative brake, the wiper motor 18 functions as a generator, generating electric power. The electric power generated is used to charge the battery 80. If charging control for the battery 80 is likely to become complicated, the generated electric power may be consumed by an element such as a resistor.

Some conceivable modes in which the brake energization or regenerative brake is used to stop the rotation of the output shaft 32 are as described below. For example, if it is inferred that the wiper blades 28, 30 are likely to stop outside of the function area 96, the brake energization or regenerative brake is performed so as to stop the wiper blades 28, 30 outside of the function area 96.

Alternatively, when the wiper blades 28, 30 are located outside of the function area 96 due to inertia of the wiping operation of the wiper blades 28, 30 after the energization of the wiper motor 18 is stopped, the brake energization or regenerative brake described above may be performed so as to stop the wiping operation of the wiper blades 28, 30.

As described above, the present embodiment can stop the wiper blades 28, 30 outside of the function area 96, in which the in-vehicle camera 94 is placed, by using the deceleration maps 104D, 104W, 104WL, 106D, 106W, 106WL described in FIGS. 7 and 8, so that the wiper blades 28, 30 are stopped without blocking the field of view of the in-vehicle camera 94 when the wiping operation of the wiper blades 28, 30 is stopped due to a supply voltage anomaly or the like.

Second Embodiment

Figure 10:
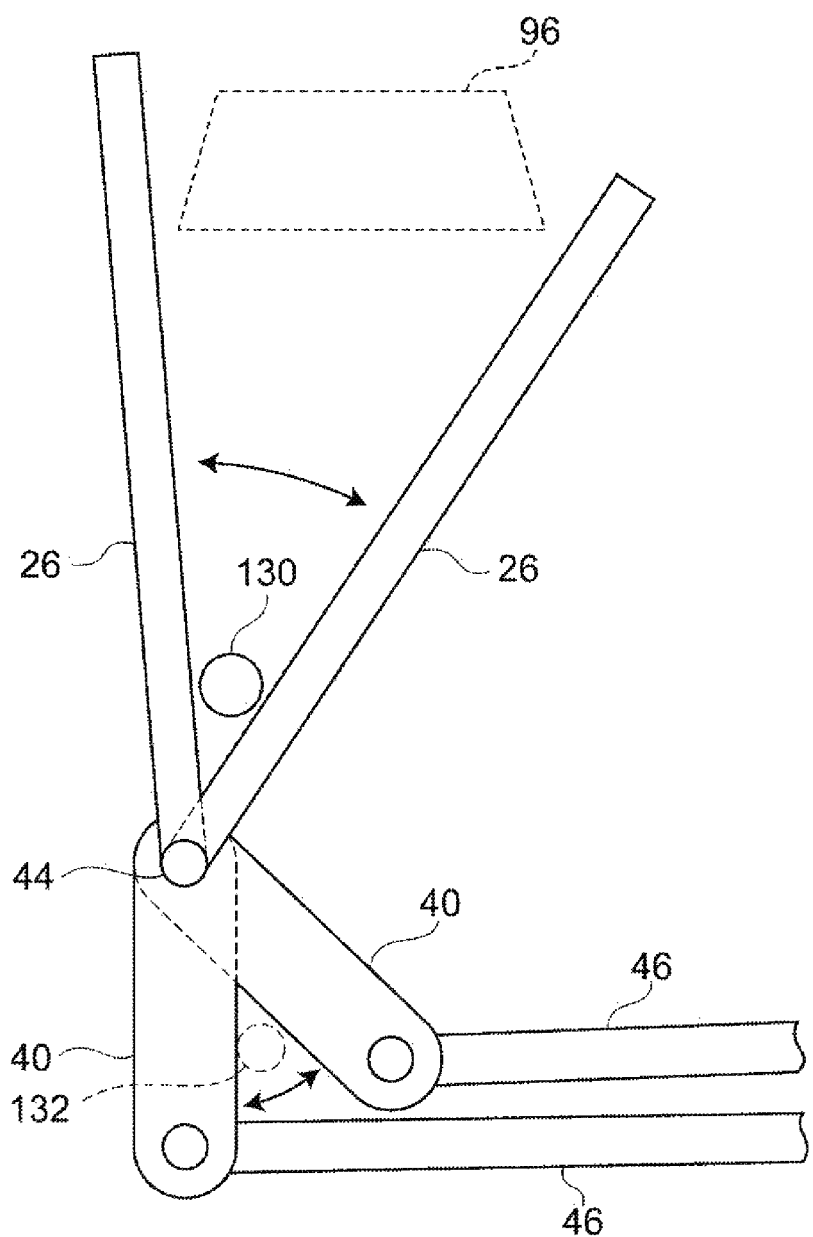
FIG. 10 is a diagram for describing an action of a stop protrusion member according to a second embodiment of the present disclosure.

A second embodiment of the present disclosure will be described. The present embodiment is different from the first embodiment in that a stop protrusion member 130 illustrated in FIG. 10 is included. The other constituent elements are substantially same as those in the first embodiment, detailed description of which is omitted.

In the present embodiment, when the wiping operation of wiper blades 28, 30 is to be stopped due to a supply voltage anomaly or the like, the stop protrusion member 130 is protruded, striking a wiper arm 26 and thereby inhibiting the wiper blade 30 from interfering with a function area 96.

Figure 11A:
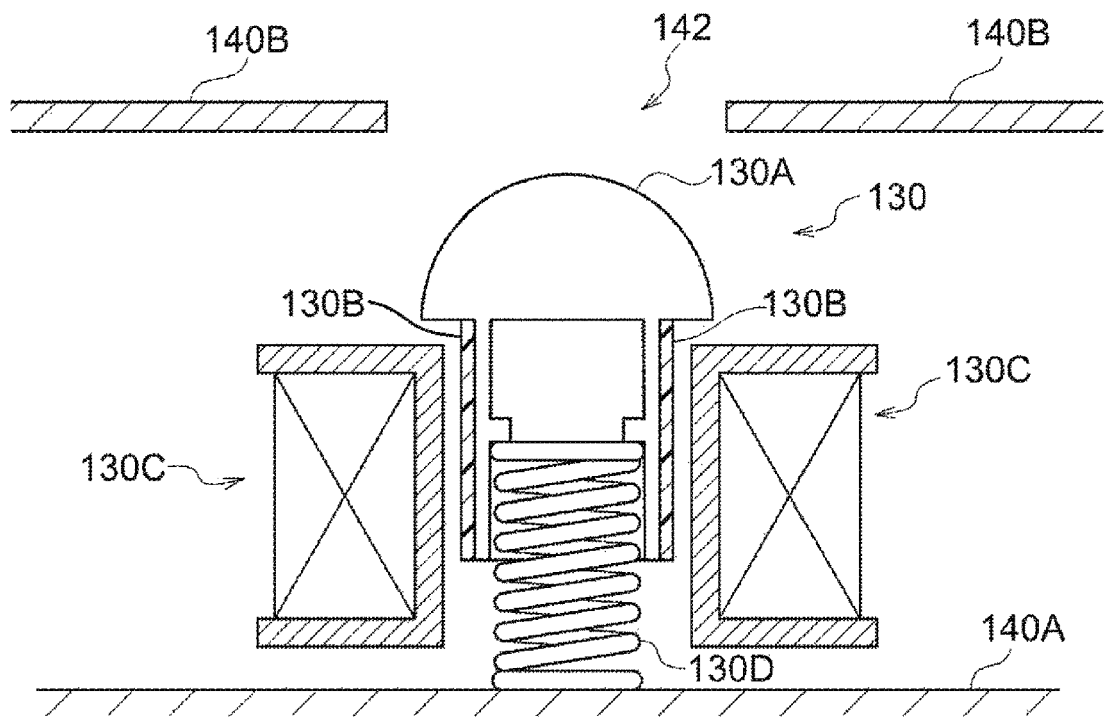
FIG. 11A is a schematic diagram illustrating an example state of the stop protrusion member observed while the wiper blades perform a wiping operation in the second embodiment of the present disclosure.
Figure 11B:
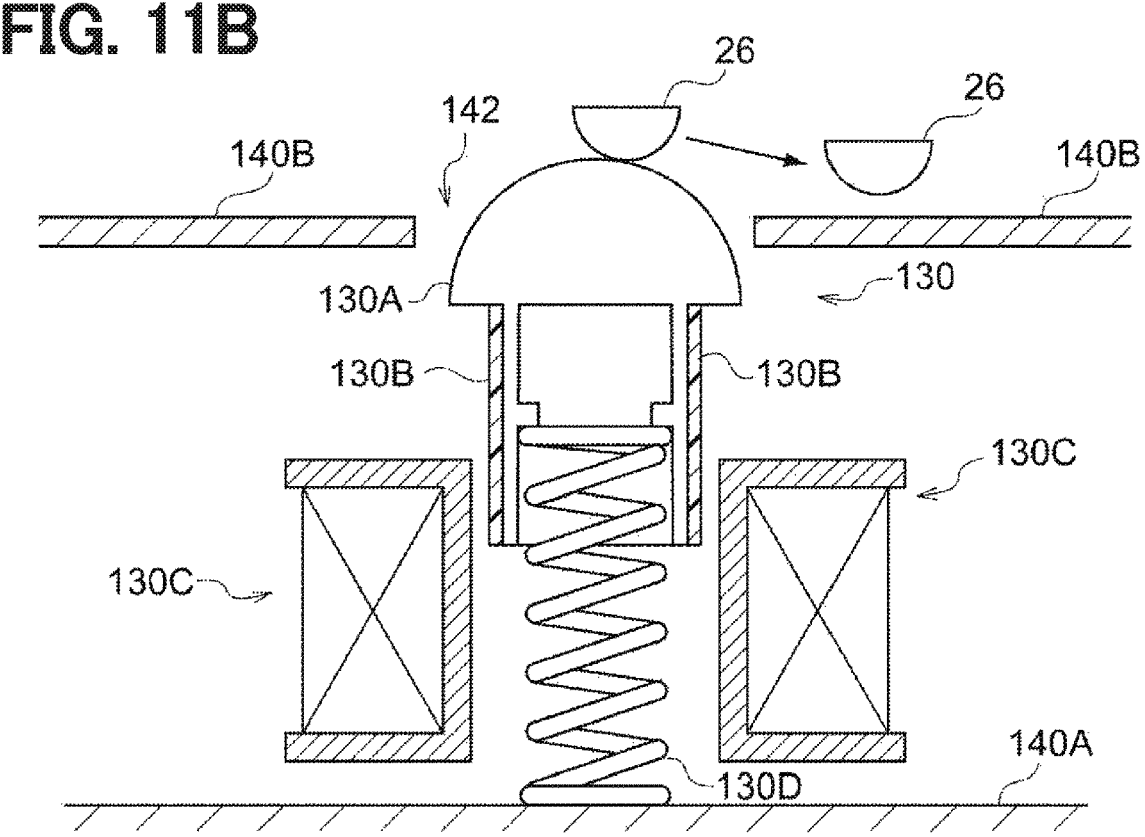
FIG. 11B is a schematic diagram illustrating an example state of the stop protrusion member observed when the wiper blades are stopped.

FIG. 11A is a schematic diagram illustrating an example state of the stop protrusion member 130 observed while the wiper blades 28, 30 perform the wiping operation. FIG. 11B is a schematic diagram illustrating an example state of the stop protrusion member 130 observed when the wiper blades 28, 30 are stopped.

As illustrated in FIG. 11A, while the wiper blades 28, 30 perform the wiping operation, a solenoid 130C is energized to attract a magnetic body 130B attached to a protrusion body 130A, compressing a spring 130D against a vehicle structure 140A. The protrusion body 130A, which is coupled to the spring 130D, is thus stored on a vehicle inner side of an opening portion 142 provided in a vehicle structure 140B.

As illustrated in FIG. 11B, when the wiping operation of the wiper blades 28, 30 is to be stopped, the energization of the solenoid 130C is stopped, releasing the protrusion body 130A from the restraint by the magnetic force of the solenoid 130C. The protrusion body 130A protrudes from the opening portion 142 due to the elasticity (urging force) of the spring 130D, which is an urging element, striking the wiper arm 26 and thereby inhibiting the wiper blades 28, 30 from interfering with the function area 96.

The protrusion body 130A has a top portion having a substantially semispherical shape in an example as illustrated in FIGS. 11A and 11B. Alternatively, the top portion may have a wedge shape, having a triangular cross-section. An element having a configuration similar to that of the stop protrusion member 130 may be also provided for a wiper arm 24 in addition to the wiper arm 26.

Alternatively, a stop protrusion member 132 may be provided for a pivot lever 40 as indicated with a broken line in FIG. 10, in place of the stop protrusion member 130. An element having a configuration similar to that of the stop protrusion member 132 may be also provided for a pivot lever 38.

Figure 12:
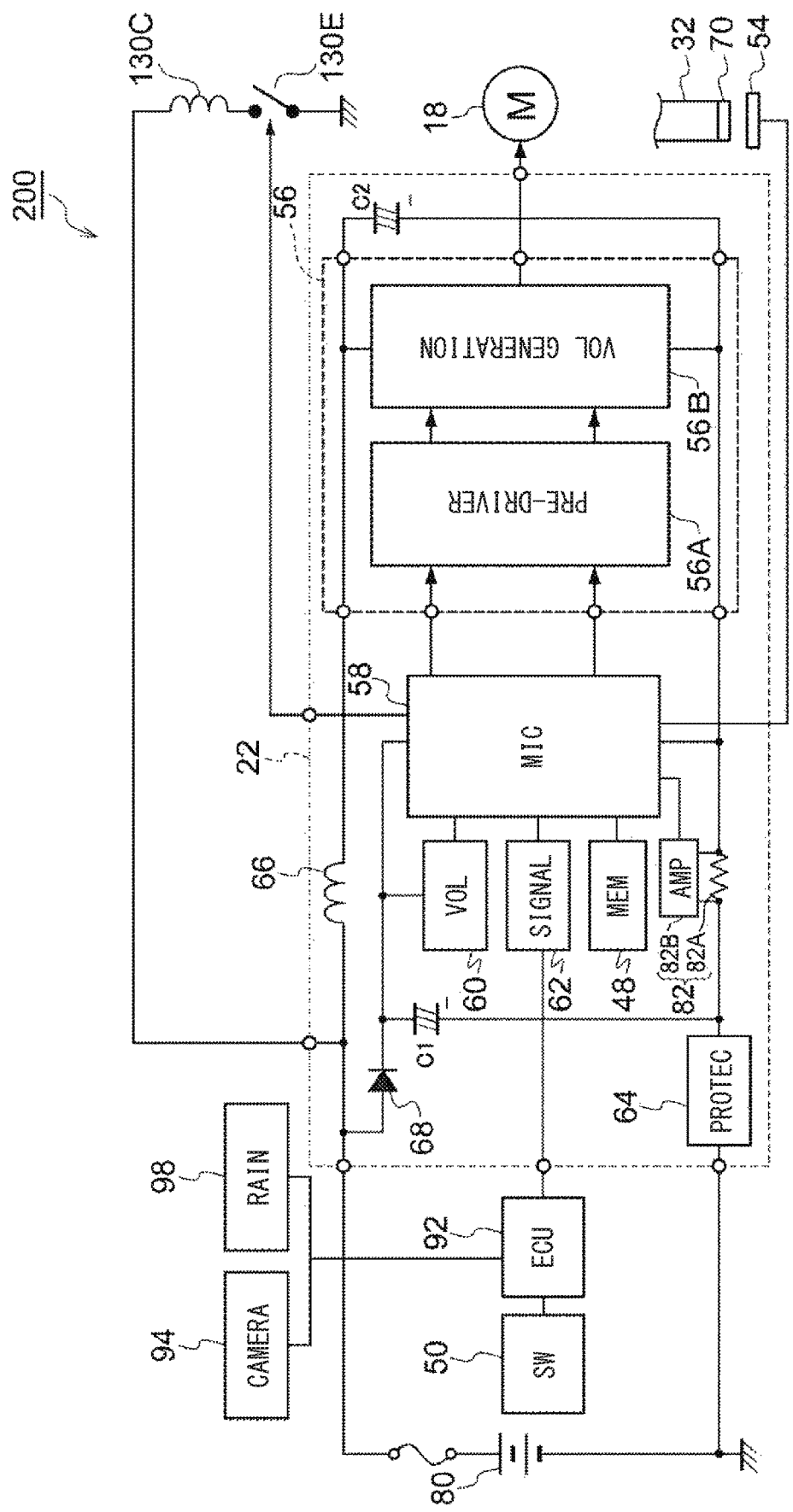
FIG. 12 is a block diagram schematically illustrating an example configuration of a wiper drive device according to the second embodiment of the present disclosure.

FIG. 12 is a block diagram schematically illustrating an example configuration of a wiper drive device 200 according to the present embodiment. The wiper drive device 200 illustrated in FIG. 12 is different from the wiper drive device 10 according to the first embodiment in that the solenoid 130C, which is related to the operation of the stop protrusion member 130, and a solenoid switch 130E, which turns on or off the passage of electricity through the solenoid 130C, are included. The other constituent elements are the same as those in the first embodiment, detailed description of which is omitted.

When stopping the wiping operation of the wiper blades 28, 30 due to a supply voltage anomaly or the like, the microcomputer 58 turns off the solenoid switch 130E. As a result, the protrusion body 130A protrudes from the opening portion 142 due to the elasticity of the spring 130D, released from the restraint by the magnetic force of the solenoid 130C.

Figure 13A:
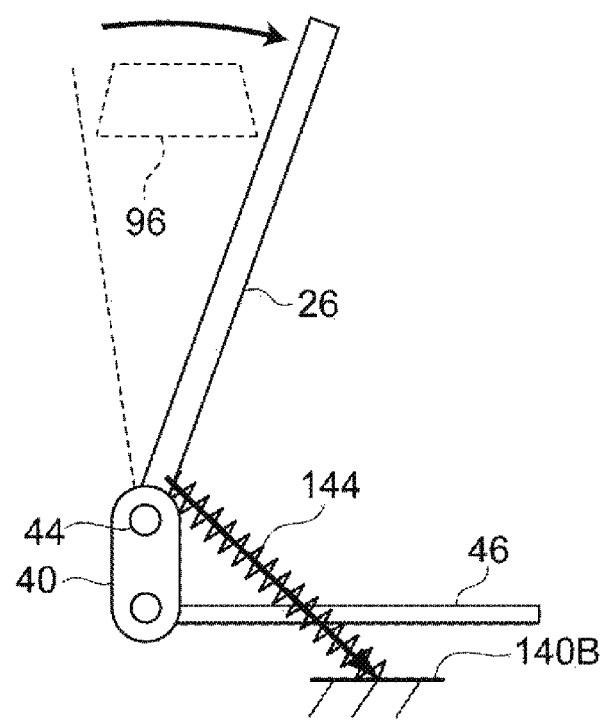
FIG. 13A is a schematic diagram of a modification of the second embodiment of the present disclosure.
Figure 13B:
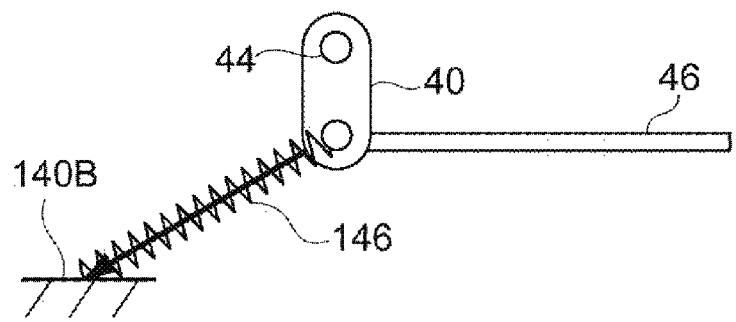
FIG. 13B is a schematic diagram of a modification of the second embodiment of the present disclosure.

FIGS. 13A and 13B are schematic diagrams of modifications of the present embodiment. As illustrated in FIG. 13A, a portion of the wiper arm 26 near a pivot shaft 44 is coupled to the vehicle structure 140B by a spring 144. When the wiping operation is stopped, the elasticity of the spring 144 inhibits the wiper blades 28, 30 from interfering with the function area 96.

As illustrated in FIG. 13B, one end of the pivot lever 40 is coupled to the vehicle structure 140B by a spring 146. When the wiping operation is stopped, the elasticity of the spring 146 inhibits the wiper blades 28, 30 from interfering with the function area 96.

As described above, by using the stop protrusion member 130, or the springs 144, 146, the present embodiment can inhibit the wiper blades 28, 30 from interfering with the function area 96 more reliably than the first embodiment, when the wiping operation of the wiper blades 28, 30 is stopped due to a supply voltage anomaly or the like.

Third Embodiment

A third embodiment of the present disclosure is described below. The present embodiment is different from the first embodiment in that an auxiliary power source is included for moving wiper blades 28, 30 from a function area 96 when the wiping operation of the wiper blades 28, 30 is to be stopped due to a supply voltage anomaly or the like. The other constituent elements are the same as those in the first embodiment, detailed description of which is omitted.

Figure 14:
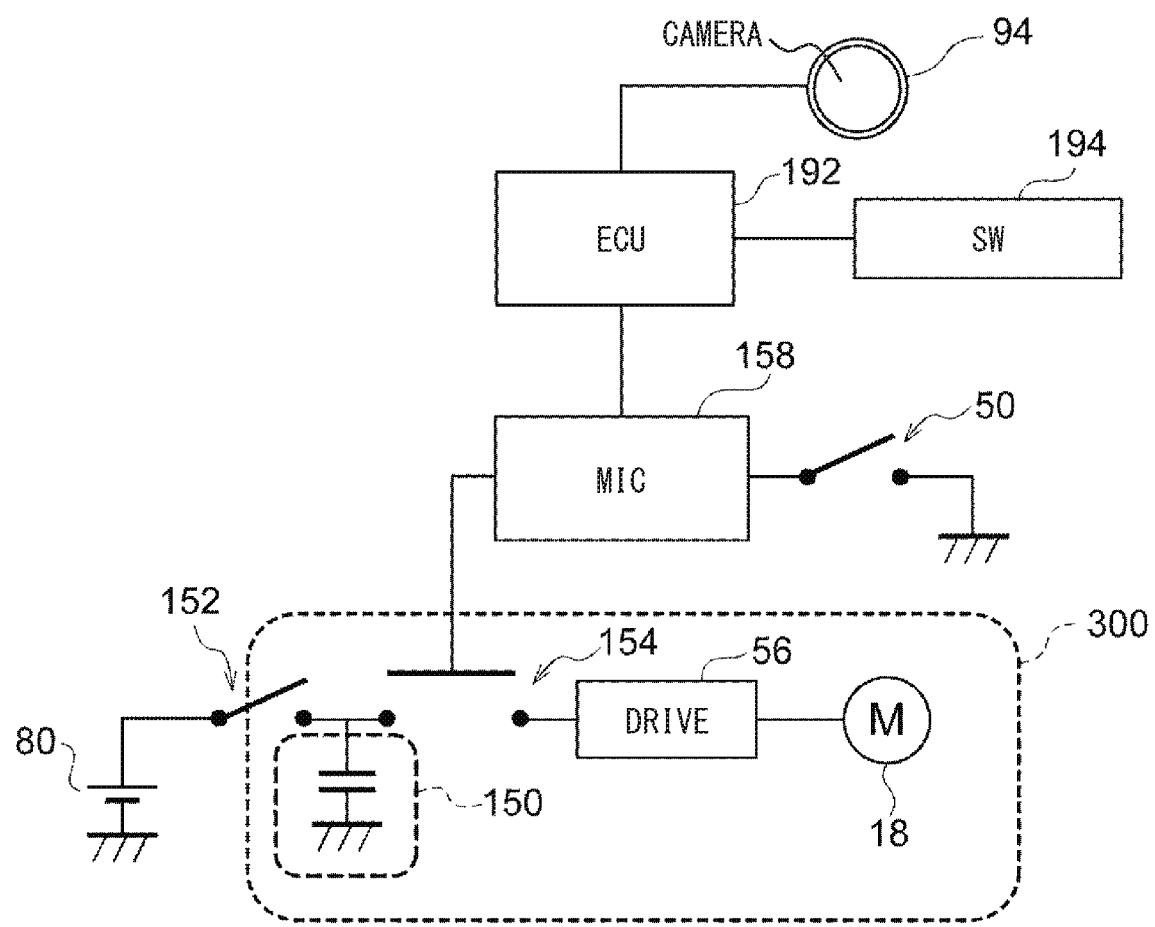
FIG. 14 is a block diagram illustrating an example of a wiper drive device according to a third embodiment of the present disclosure.

FIG. 14 is a block diagram illustrating an example of a wiper drive device 300 according to the present embodiment. The present embodiment is different from the first embodiment in that an auxiliary power source 150, which is a capacitor or a secondary battery, and switches 152, 154 are included. The other constituent elements of the present embodiment are the same as those in the first embodiment.

While the wiper blades 28, 30 perform the wiping operation, a microcomputer 158 keeps the switch 152 and the switch 154 on to allow a battery 80, which is the main power source, to supply electric power to the wiper motor 18 and charge the auxiliary power source 150.

When the wiping operation of the wiper blades 28, 30 is to be stopped due to a supply voltage anomaly or the like, the stop positions of the wiper blades 28, 30 detected by a rotary angle sensor 54 may be likely to interfere with the function area 96. In this case, the microcomputer 158 turns off the switch 152 while turning on the switch 154, allowing the auxiliary power source 150 to supply electric power to the wiper motor 18 so that the wiper motor 18 operates to move the wiper blades 28, 30 out of the function area 96.

In a configuration illustrated in FIG. 14, When an automated driving switch 194 is turned on and a main ECU 192 notifies the microcomputer 158 that the vehicle is in an automated driving mode, the microcomputer 158 may cause the wiper blades 28, 30 to move out of the function area 96 by using electric power from the auxiliary power source 150 or the battery 80.

Figure 15:
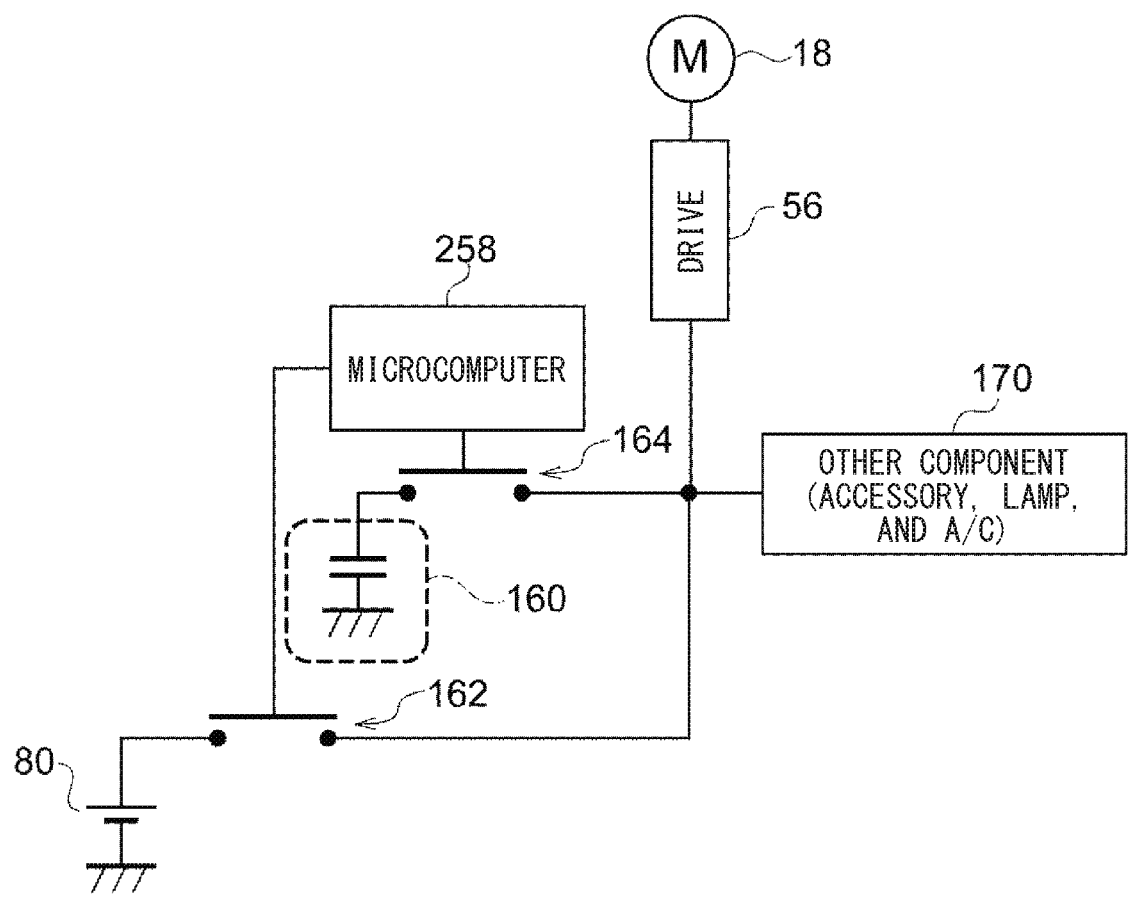
FIG. 15 is a block diagram illustrating a modification of the wiper drive device according to the third embodiment of the present disclosure.

Alternatively, as illustrated in FIG. 15, an auxiliary power source 160 that is shared with another component 170, such as an accessory, a lamp, and an air conditioner, may be provided. While the wiper blades 28, 30 perform the wiping operation, a microcomputer 258 keeps a switch 162 on and a switch 164 off to allow the battery 80, which is the main power source, to supply electric power to the wiper motor 18 and the other component 170.

When the wiping operation of the wiper blades 28, 30 is to be stopped due to a supply voltage anomaly or the like, the stop positions of the wiper blades 28, 30 detected by the rotary angle sensor 54 may be likely to interfere with the function area 96. In this case, the switch 162 is turned off while the switch 164 is turned on to allow the auxiliary power source 160 to supply electric power to the wiper motor 18 so that the wiper motor 18 operates to move the wiper blades 28, 30 out of the function area 96.

Some conceivable modes in which the wiper blades 28, 30 are moved out of the function area by using electric power from the auxiliary power source 150 or the auxiliary power source 160 are as described below.

For example, if it is inferred that the wiper blades 28, 30 are likely to stop outside of the function area 96, the microcomputer 158 or the microcomputer 258 immediately stops an output shaft 32 by performing control for a drive circuit 56 generating voltage, from electric power supplied by the corresponding auxiliary power source 150 or the corresponding auxiliary power source 160, for rotating the output shaft 32 in a direction opposite to the current rotation direction.

If it is inferred that the wiper blades 28, 30 are likely to stop in the function area 96, the microcomputer 158 or the microcomputer 258 moves the wiper blades 28, 30 out of the function area 96 by performing control causing the drive circuit 56 to generate voltage, from electric power supplied by the auxiliary power source 150 or the auxiliary power source 160, for rotating the output shaft 32 in the current rotation direction.

When the wiping operation of the wiper blades 28, 30 is stopped due to a supply voltage anomaly or the like, the battery 80 may not be able to supply electric power. In the present embodiment, the wiper motor 18 can be operated using the auxiliary power source 150 or the auxiliary power source 160 to inhibit the wiper blades 28, 30 from interfering with the function area.

As described above, a wiper drive device according to an aspect of the present disclosure includes: a drive member configured to cause a wiper blade to perform a wiping operation so that the wiper blade wipes a region of a windshield, the region of the windshield including a to-be-imaged region of the windshield, the to-be-imaged region of the windshield being included in a field of view of a camera for imaging a predefined imaging range near a vehicle through the windshield; and a stop section configured to stop the wiper blade in a region of the windshield outside of the to-be-imaged region when an anomaly that hinders the wiping operation occurs while the drive member is causing the wiper blade to perform on the windshield.

By performing control for stopping the wiper blade outside of the to-be-imaged region on the windshield when an anomaly that hinders the wiping operation occurs, the wiper drive device can stop the wiper blade so that the wiper blade does not block the field of view of the camera.

In the present disclosure, if the wiper blade is located within the to-be-imaged region at the time of occurrence of an anomaly, the stop section may control the drive member to cause the wiping operation to continue until the wiper blade is moved out of the to-be-imaged region, and then stop the wiper blade.

By causing the wiping operation to continue until the wiper blade is moved out of the to-be-imaged region, the wiper drive device can stop the wiper blade so that the wiper blade does not block the field of view of the camera.

Furthermore, in the present disclosure, the drive member may include a wiper motor having an output shaft coupled to the wiper blade, and an electric power supply section configured to supply electric power to the wiper motor to cause the wiper blade to perform the wiping operation, and the stop section may include an angle detection portion configured to detect a rotary angle of the output shaft of the wiper motor, an anomaly detection section configured to detect occurrence of an anomaly that hinders the wiping operation, a derivation section configured to derive a position and wiping speed of the wiper blade from a rotary angle detected by the angle detection portion, and a stop controller configured to control the electric power supply section to cause the wiper blade to stop in a region of the windshield outside of the to-be-imaged region on the basis of a position and wiping speed of the wiper blade derived by the derivation section when the anomaly is detected by the anomaly detection section.

By controlling the electric power supply section to cause the wiper blade to stop in a region of the windshield outside of the to-be-imaged region based on the wiping speed and position of the wiper blade, the wiper drive device can stop the wiper blade so that the wiper blade does not block the field of view of the camera.

Furthermore, in the present disclosure, the stop controller may perform control for decelerating and stopping rotation of the output shaft to stop the wiper blade in a region of the windshield outside of the to-be-imaged region.

By performing the control for decelerating and stopping the rotation of the output shaft, the wiper drive device can stop the wiper blade so that the wiper blade does not block the field of view of the camera.

Furthermore, in the present disclosure, the stop controller may perform control for causing the wiper motor to generate regenerative electric power so as to decelerate and stop the rotation of the output shaft.

By using the regenerative brake, the wiper drive device can stop the wiper blade so that the wiper blade does not block the field of view of the camera.

Furthermore, in the present disclosure, when the wiper motor is a brushed motor, the stop controller may perform control for making a short circuit between brushes of the wiper motor so as to decelerate and stop the rotation of the output shaft.

By using the brake energization, the wiper drive device can stop the wiper blade so that the wiper blade does not block the field of view of the camera.

Furthermore, in the present disclosure, when the wiper motor is a brushless motor, the stop controller may perform control for making a short circuit between phases of the wiper motor so as to decelerate and stop the rotation of the output shaft.

By using the brake energization, the wiper drive device can stop the wiper blade so that the wiper blade does not block the field of view of the camera.

Furthermore, in the present disclosure, an auxiliary power source having a capacity smaller than that of a main power source of the wiper motor may be further included, and the stop controller may perform control for causing the electric power supply section to generate voltage, from electric power supplied by the auxiliary power source, for rotating the output shaft of the wiper motor in a direction opposite to the current rotation direction so as to stop the wiper blade in a region of the windshield outside of the to-be-imaged region.

By rotating the output shaft of the wiper motor in the direction opposite to the current rotation direction using electric power from the auxiliary power source, the wiper drive device can stop the wiper blade so that the wiper blade does not block the field of view of the camera.

Furthermore, in the present disclosure, the stop controller may perform control for causing the electric power supply section to generate voltage, from electric power supplied by the auxiliary power source, for rotating the output shaft of the wiper motor in the current rotation direction when the stop position of the wiper blade derived based on a position and wiping speed of the wiper blade derived by the derivation section is within the to-be-imaged region.

By using the stop controller to cause the output shaft of the wiper motor to rotate in the current rotation direction using electric power from the auxiliary power source when the stop position of the wiper blade derived based on the position and wiping speed of the wiper blade is within the to-be-imaged region, the wiper drive device can stop the wiper blade so that the wiper blade does not block the field of view of the camera.

Furthermore, in the present disclosure, the stop controller may perform control for decelerating and stopping the rotation of the output shaft when the wiper blade is located outside of the to-be-imaged region due to inertia of the wiping operation after power supply from the electric power supply section to the wiper motor is stopped due to occurrence of an anomaly.

By using brake energization or regenerative brake when the wiper blade is located outside of the to-be-imaged region due to inertia of the wiping operation after the generation of voltage by the drive member is stopped, the wiper drive device can stop the wiper blade so that the wiper blade does not block the field of view of the camera.

Furthermore, in the present disclosure, a moisture detection portion configured to detect moisture on a windshield surface is further included, and the stop controller may derive the stop position of the wiper blade based on a longer time for decelerating and stopping the rotation of the output shaft when the moisture detection portion detects moisture on the windshield surface than that of when the moisture detection portion does not detect moisture on the windshield surface.

By deriving the stop position of the wiper blade on the basis of a longer time from deceleration to stop of the rotation of the output shaft when the moisture detection portion detects moisture on the windshield surface than that of when the moisture detection portion does not detect moisture on the windshield surface, the wiper drive device can stop the wiper blade so that the wiper blade does not block the field of view of the camera also when the windshield is wet.

Furthermore, in the present disclosure, a moving mechanism configured to move the wiper blade out of the to-be-imaged region when an anomaly occurs may be further included.

By using the moving mechanism configured to move the wiper blade out of the to-be-imaged region, the wiper drive device can stop the wiper blade so that the wiper blade does not block the field of view of the camera.

Furthermore, in the present disclosure, the moving mechanism may come into contact with a wiper arm that transmits the driving force of the wiper motor to the wiper blade so as to move the wiper blade to a region outside of the to-be-imaged region.

By causing the moving mechanism to come into contact with the wiper arm and move the wiper blade out of the to-be-imaged region, the wiper drive device can stop the wiper blade so that the wiper blade does not block the field of view of the camera.

Furthermore, in the present disclosure, the moving mechanism may include a coil configured to be magnetized, and a protrusion portion having a magnetic body configured to be attracted to the coil when the coil is magnetized, the protrusion portion configured to be projected by urging force of an urging element to come into contact with the wiper arm when the magnetization of the coil is stopped, and the stop section may perform control for stopping the magnetization of the coil when an anomaly occurs.

By stopping the magnetization of the coil and thereby causing the moving mechanism to rise to come into contact with the wiper arm, the wiper drive device can stop the wiper blade so that the wiper blade does not block the field of view of the camera.

Furthermore, in the present disclosure, the stop section may stop the wiper blade in a region of the windshield outside of the to-be-imaged region when an anomaly occurs during automated driving of the vehicle.

By stopping the wiper blade in a region of the windshield outside of the to-be-imaged region during automated driving, the wiper drive device can inhibit the wiper blade from interrupting acquisition of information on an area forward of the vehicle, the information being needed for the automated driving.

Furthermore, in the present disclosure, the stop section may perform control for moving every one of wiper blades to a region outside of the to-be-imaged region.

By moving all of the wiper blades provided to a region outside of the to-be-imaged region, the wiper drive device can inhibit the wiper blades from interrupting the acquisition of information, needed for the automated driving, on an area forward of the vehicle.

It is noted that a flowchart or the processing of the flowchart in the present application includes multiple steps (also referred to as sections), each of which is represented, for instance, as S500. Further, each step can be divided into several sub-steps while several steps can be combined into a single step.

The embodiment, configuration, and aspect of the wiper driving device according to the present disclosure have been exemplified above, but the embodiment, configuration, and aspect according to the present disclosure are not limited to the above-described embodiments, configurations, and aspects. Absent. For example, embodiments, configurations, and aspects obtained by appropriately combining technical parts disclosed in different embodiments, configurations, and aspects are also included in the scope of the embodiments, configurations, and aspects according to the present disclosure.

What is claimed is:

1. A wiper drive device comprising:
    a drive member that causes a wiper blade to wipe a region of a windshield as a wiping operation, the region of the windshield including a to-be-imaged region of the windshield, the to-be-imaged region being included in a field of view of a camera that images a predefined imaging range near a vehicle through the windshield; and
    a stop section that stops the wiper blade in an outside region in response to an anomaly that hinders the wiping operation occurs while the drive member causes the wiper blade to perform the wiping operation on the windshield, the outside region being a region of the windshield outside of the to-be-imaged region,
    wherein:
        the drive member includes:
            a wiper motor having an output shaft coupled to the wiper blade, and
            an electric power supply that supplies electric power to the wiper motor to cause the wiper blade to perform the wiping operation; and
        the stop section includes:
            an anomaly detection section that detects whether the anomaly occurs, and
            a stop controller that controls the electric power supply to cause the wiper blade to stop in the outside region in response to detecting the anomaly.

2. The wiper drive device according to claim 1, wherein:
    in response to that the anomaly occurs in a case where the wiper blade is located within the to-be-imaged region, the stop section controls the drive member to cause the wiping operation to continue until the wiper blade is moved out of the to-be-imaged region, and then stops the wiper blade.

3. The wiper drive device according to claim 1, wherein:
    the stop section includes:
        an angle detection portion that is configured to detect a rotary angle of the output shaft of the wiper motor, and a derivation section that is configured to derive a position and wiping speed of the wiper blade from the rotary angle detected; and the stop controller stops the wiper blade based on the position and the wiping speed of the wiper blade derived by the derivation section.

4. The wiper drive device according to claim 3, wherein: the stop controller performs a control to decelerate and stop rotation of the output shaft when the wiper blade is stopped in the outside region.

5. The wiper drive device according to claim 4, wherein: the stop controller performs a control to cause the wiper motor to generate regenerative electric power so as to decelerate and stop the rotation of the output shaft.

6. The wiper drive device according to claim 4, wherein: the wiper motor is a brushed motor; and the stop controller performs a control to make a short circuit between brushes of the wiper motor so as to decelerate and stop the rotation of the output shaft.

7. The wiper drive device according to claim 4, wherein: the wiper motor is a brushless motor; and the stop controller performs a control to make a short circuit between phases of the wiper motor so as to decelerate and stop the rotation of the output shaft.

8. The wiper drive device according to claim 3, further comprising:

an auxiliary power source having a capacity smaller than amount of a main power source of the wiper motor, wherein:

the stop controller performs a control to cause the electric power supply to generate voltage, from electric power supplied by the auxiliary power source, that rotates the output shaft of the wiper motor in a direction opposite to a current rotation direction when the wiper blade stops in the outside region.

9. The wiper drive device according to claim 8, wherein: the stop controller performs the control to cause the electric power supply to generate voltage from the electric power supplied by the auxiliary power source so as to rotate the output shaft of the wiper motor in the current rotation direction, in response to that a stop position of the wiper blade derived based on the position and the wiping speed of the wiper blade is within the to-be-imaged region.

10. The wiper drive device according to claim 3, wherein: the stop controller performs a control to decelerate and stop rotation of the output shaft in response to that the wiper blade is located in the outside region due to inertia of the wiping operation after the electric power supply stops power supply to the wiper motor due to occurrence of the anomaly.

11. The wiper drive device according to claim 3, further comprising a moisture sensor that detects moisture on a surface of the windshield, wherein:

in response to detecting the moisture on the windshield surface, the stop controller derives a stop position of the wiper blade by setting a longer time for decelerating and stopping rotation of the output shaft than a time for decelerating and stopping rotation in a case where the moisture sensor detecting no moisture on the surface of the windshield.

12. The wiper drive device according to claim 1, further comprising:

a moving mechanism that moves the wiper blade out of the to-be-imaged region in response to the anomaly occurring.

13. The wiper drive device according to claim 12, wherein:

the moving mechanism comes into contact with a wiper arm that transmits driving force of the wiper motor to the wiper blade, causing the wiper blade to be moved to the outside region.

14. The wiper drive device according to claim 13, wherein:

the moving mechanism includes:

a coil that is magnetized, and a protrusion that has a magnetic body attracted to the coil in response to that the coil is magnetized, and in response to stopping of magnetization of the coil, the protrusion is protruded by urging force by an urging element and contacts the wiper arm; and the stop section performs a control to stop the magnetization of the coil in response to that the anomaly occurs.

15. The wiper drive device according to claim 1, wherein: the stop section stops the wiper blade in the outside region in response to that the anomaly occurs during automated driving of the vehicle.

16. The wiper drive device according to claim 1, wherein: the stop section performs a control to move all of a plurality of wiper blades, which includes the wiper blade, to the outside region.

17. The wiper drive device according claim 1, wherein: the anomaly that hinders the wiping operation includes at least one of:

a case in which temperature of a board on which the wiper drive device is mounted exceeds a threshold temperature, a case in which current generated by the drive member exceeds a threshold current, a case in which a state of charge of a battery is not more than a predetermined reference value, or a case in which a supply voltage for the wiper drive device is not more than a lower limit value.

18. A wiper drive device comprising:

a drive member that causes a wiper blade to wipe a region of a windshield;

a camera that images a predefined imaging range near a vehicle through the windshield, the predefined imaging range including a to-be-imaged region of the windshield, the region of the windshield to be wiped including the to-be-imaged region; and a controller that stops the wiper blade in an outside region in response to an anomaly hindering the wiping operation occurs while the wiper blade wipes the region of the windshield, the outside region being a region of the windshield outside of the to-be-imaged region, wherein:

the drive member includes:

a motor having an output shaft coupled to the wiper blade, and an electric power supply that is configured to supply electric power to the wiper motor to cause the wiper blade to wipe the region of the windshield; and the controller that:

detects whether the anomaly occurs, and controls the electric power supply to cause the wiper blade to stop in the outside region in response to detecting the anomaly.

\* \* \* \* \*